(12) United States Patent
Choi et al.

(10) Patent No.: US 11,476,694 B2
(45) Date of Patent: Oct. 18, 2022

(54) ELECTRONIC DEVICE INCLUDING RESONANT CHARGING CIRCUIT

(71) Applicant: Samsung Electronics Co., Ltd., Gyeonggi-do (KR)

(72) Inventors: Hangseok Choi, Gyeonggi-do (KR); Kisun Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 98 days.

(21) Appl. No.: 17/072,198

(22) Filed: Oct. 16, 2020

(65) Prior Publication Data

US 2021/0119465 A1    Apr. 22, 2021

(30) Foreign Application Priority Data

Oct. 17, 2019    (KR) .................. 10-2019-0129197
Apr. 24, 2020    (KR) .................. 10-2020-0050361

(51) Int. Cl.
*H02J 7/00*    (2006.01)

(52) U.S. Cl.
CPC ...... *H02J 7/00712* (2020.01); *H02J 7/00032* (2020.01)

(58) Field of Classification Search
CPC .............................................. H02J 7/00032
See application file for complete search history.

(56) References Cited

U.S. PATENT DOCUMENTS

| | | |
|---|---|---|
| 7,796,410 B2 | 9/2010 | Takayanagi et al. |
| 8,891,254 B2 | 11/2014 | Kominami et al. |
| 9,143,032 B2 | 9/2015 | Le et al. |
| 9,555,714 B2 | 1/2017 | Tomura et al. |
| 9,780,663 B2 | 10/2017 | Lidsky et al. |
| 9,866,039 B2 | 1/2018 | Adolf et al. |
| 9,954,436 B2 | 4/2018 | Khlat |
| 10,063,139 B2 | 8/2018 | Le et al. |
| 10,075,007 B2 | 9/2018 | Langlinais et al. |
| 10,097,017 B2 | 10/2018 | Greening et al. |

(Continued)

FOREIGN PATENT DOCUMENTS

| | | |
|---|---|---|
| CN | 105934359 | 9/2017 |
| KR | 1020200136594 | 12/2020 |
| WO | WO 2019/150597 | 8/2019 |

OTHER PUBLICATIONS

International Search Report dated Feb. 8, 2021 issued in counterpart application No. PCT/KR2020/014181, 9 pages.

(Continued)

*Primary Examiner* — Yalkew Fantu
(74) *Attorney, Agent, or Firm* — The Farrell Law Firm, P.C.

(57) ABSTRACT

An electronic device is provided that includes a battery, a power management module, and a processor electrically connected to the power management module. The power management module includes a charging circuit including a plurality of switches, a capacitor, and an inductor. The power management module receives power from an external power supply device, identifies an electrical connection between the charging circuit and the external power supply device, operates in a first mode to charge the battery when a type of the external power supply device is a first type, and operates in a second mode to charge the battery when the type of the external power supply device is a second type.

20 Claims, 20 Drawing Sheets

(56) References Cited

U.S. PATENT DOCUMENTS

| | | |
|---|---|---|
| 10,166,878 B2 | 1/2019 | Kumazawa et al. |
| 10,186,945 B1 | 1/2019 | Lidsky et al. |
| 10,283,971 B2 | 5/2019 | Adolf et al. |
| 10,389,246 B1 | 8/2019 | Lidsky et al. |
| 10,447,057 B2 | 10/2019 | Yuan |
| 10,468,963 B2 | 11/2019 | Lidsky et al. |
| 10,673,260 B2 | 6/2020 | Greening et al. |
| 10,784,769 B2 | 9/2020 | Lidsky et al. |
| 2008/0101096 A1 | 5/2008 | Takayanagi et al. |
| 2012/0268063 A1* | 10/2012 | Qiu ................... H02J 7/00714 363/84 |
| 2013/0181521 A1 | 7/2013 | Khlat |
| 2014/0306648 A1 | 10/2014 | Le et al. |
| 2014/0306673 A1 | 10/2014 | Le et al. |
| 2015/0303704 A1* | 10/2015 | Juan ...................... H02J 50/90 320/108 |
| 2016/0129796 A1* | 5/2016 | Tomura ................ B60W 20/00 903/906 |
| 2016/0261189 A1* | 9/2016 | Lidsky ................ H02M 3/156 |
| 2016/0332529 A1 | 11/2016 | Kumazawa et al. |
| 2016/0380455 A1 | 12/2016 | Greening et al. |
| 2017/0141583 A1 | 5/2017 | Adolf et al. |
| 2018/0138718 A1 | 5/2018 | Adolf et al. |
| 2018/0205235 A1 | 7/2018 | Yuan |
| 2018/0248387 A1 | 8/2018 | Wang et al. |
| 2019/0006933 A1 | 1/2019 | Lidsky et al. |
| 2019/0013683 A1 | 1/2019 | Greening et al. |
| 2019/0103766 A1 | 4/2019 | Von Novak, III et al. |
| 2019/0115823 A1 | 4/2019 | Lidsky et al. |
| 2019/0341849 A1 | 11/2019 | Lidsky et al. |
| 2020/0112242 A1 | 4/2020 | Lidsky et al. |
| 2020/0381994 A1 | 12/2020 | Choi et al. |

OTHER PUBLICATIONS

International Search Report dated Feb. 9, 2021 issued in counterpart application No. PCT/KR2020/014183, 10 pages.
U.S. Notice of Allowance dated Aug. 25, 2022 issued in counterpart U.S. Appl. No. 17/072,211, 19 pages.

* cited by examiner

ELECTRONIC DEVICE INCLUDING RESONANT CHARGING CIRCUIT

CROSS-REFERENCE TO RELATED APPLICATION(S)

This application is based on and claims priority under 35 U.S.C. § 119 to Korean Patent Application Nos. 10-2019-0129197 and 10-2020-0050361, which were filed in the Korean Intellectual Property Office on Oct. 17, 2019, and Apr. 24, 2020, respectively, the entire disclosure of each of which is incorporated herein by reference.

BACKGROUND

1. Field

The disclosure relates generally to an electronic device including a resonant charging circuit.

2. Description of Related Art

An electronic device such as a smartphone or a tablet personal computer (PC) may operate using power provided from a battery. A power management module (e.g., a power management integrated circuit (PMIC)) may transfer power provided from the battery to various components (e.g., a processor, a memory, or a communication chip) inside the electronic device.

The battery inside the electronic device may be charged through an external power source. Recently, various charging methods, wired or wireless, have been applied for fast charging. Among fast charging methods, a direct charging technology may allow an external power supply device (e.g., a power adapter) to control a constant voltage or a constant current for the battery inside the electronic device, and may simplify a charging circuit inside the electronic device. In addition, the direct charging technology may charge the battery with a high current while minimizing heat generation in the electronic device.

An electronic device may support charging by the direct charging technology using a switched capacitor voltage divider (SCVD) circuit. Unlike general switching converters, an SCVD circuit may achieve high efficiency of about 96% or more to reduce heat generation of the electronic device, but may have a fixed voltage conversion ratio depending on the circuit configuration. Accordingly, compatibility with various types of power devices or charging devices may be limited.

For example, when an SCVD circuit is connected to a legacy power adapter that supplies a fixed voltage of about 5V or 9V, because the SCVD circuit cannot perform the charging operation, a separate switching charger may have to be installed. As a result, a space for mounting components inside the electronic device may be reduced, and a cost of the electronic device may increase due to additional components.

SUMMARY

The disclosure addresses at least the above-mentioned problems and/or disadvantages and provides at least the advantages described below.

Accordingly, an aspect of the disclosure is to provide an electronic device including a resonant charging circuit.

In accordance with an aspect of the disclosure, an electronic device includes a battery, a power management module electrically connected to the battery and that manages a charging or a discharging of the battery, and a processor electrically connected to the power management module. The power management module includes a charging circuit including a plurality of switches, a capacitor, and an inductor. The power management module identifies an electrical connection between the charging circuit and an external power supply device, receives power from the external power supply device, determines a type of the connected external power supply device, controls the charging circuit to operate in a first mode in which the plurality of switches are controlled such that the charging circuit has a fixed voltage conversion ratio due to a resonance of the capacitor and the inductor, to charge the battery, when the type of the external power supply device is a first type, and controls the charging circuit to operate in a second mode in which the plurality of switches are controlled such that a voltage conversion ratio changes in response to a charging ratio of the battery, to charge the battery, when the type of the external power supply device is a second type.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
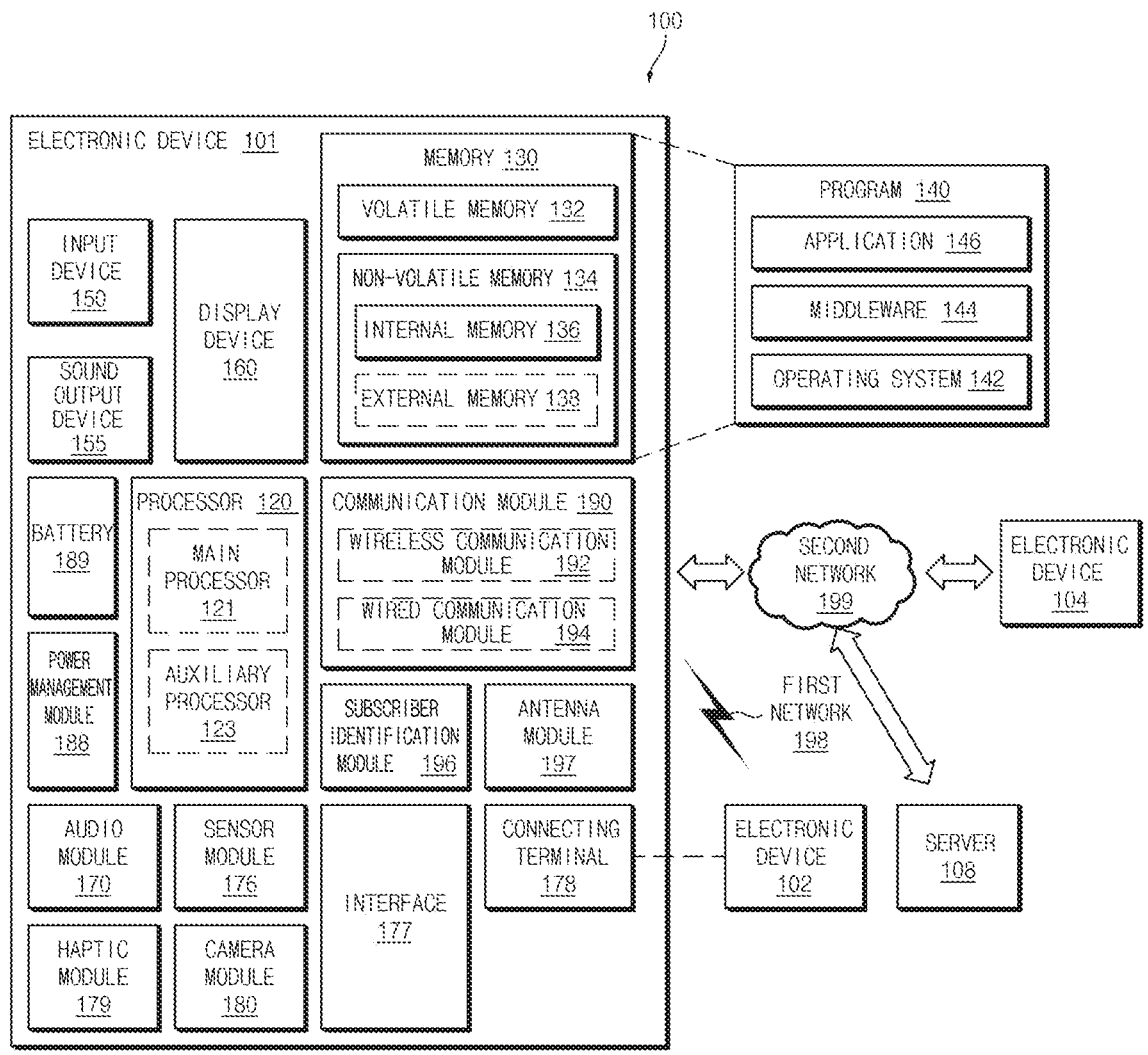
FIG. 1 is a diagram illustrating an electronic device in a network environment, according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

FIG. 1 illustrates an electronic device 101 in a network environment 100 according to an embodiment. An electronic device according to various embodiments of the present disclosure may include at least one of a smartphone, a tablet PC, a mobile phone, a video telephone, an electronic book reader, a desktop PC, a laptop PC, a netbook computer, a workstation, a server, personal digital assistant (PDA), a portable multimedia player (PMP), a Motion Picture Experts Group (MPEG-1 or MPEG-2) Audio Layer 3 (MP3) player, a mobile medical device, a camera, or a wearable device. According to various embodiments, a wearable device may include at least one of an accessory type of device (e.g., a timepiece, a ring, a bracelet, an anklet, a necklace, glasses, a contact lens, or a head-mounted device (HMD)), a one-piece fabric or clothes type of device (e.g., electronic clothes), a body-attached type of device (e.g., a skin pad or a tattoo), or a bio-implantable type of device (e.g., implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automatic teller's machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of this disclosure may not be limited to the above-described devices, and may provide functions of a plurality of devices like smartphones which has measurement function of personal biometric information (e.g., heart rate or blood glucose). In this disclosure, the term "user" may refer to a person who uses an electronic device or may refer to a device (e.g., an artificial intelligence electronic device) that uses the electronic device.

The electronic device 101 may communicate with an electronic device 102 through a first network 198 (e.g., a short-range wireless communication network) or may communicate with an electronic device 104 or a server 108 through a second network 199 (e.g., a long-distance wireless communication network) in a network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. According to some embodiments, at least one (e.g., the display device 160 or the camera module 180) among components of the electronic device 101 may be omitted or one or more other components may be added to the electronic device 101. According to some embodiments, some of the above components may be implemented with one integrated circuit. For example, the sensor module 176 (e.g., a fingerprint sensor, an iris sensor, or an illuminance sensor) may be embedded in the display device 160 (e.g., a display).

The processor 120 may execute, for example, software (e.g., a program 140) to control at least one of other components (e.g., a hardware or software component) of the electronic device 101 connected to the processor 120 and may process or compute a variety of data. According to an embodiment, as a part of data processing or operation, the processor 120 may load a command set or data, which is received from other components (e.g., the sensor module 176 or the communication module 190), into a volatile memory 132, may process the command or data loaded into the volatile memory 132, and may store result data into a nonvolatile memory 134. According to an embodiment, the processor 120 may include a main processor 121 (e.g., a central processing unit (CPU) or an application processor (AP)) and an auxiliary processor 123 (e.g., a graphic processing device, an image signal processor, a sensor hub processor, or a communication processor), which operates independently from the main processor 121 or with the main processor 121. Additionally or alternatively, the auxiliary processor 123 may use less power than the main processor 121, or is specified to a designated function. The auxiliary processor 123 may be implemented separately from the main processor 121 or as a part thereof.

The auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the ISP or the CP) may be implemented as a part of another component (e.g., the camera module 180 or the communication module 190) that is functionally related to the auxiliary processor 123.

The memory 130 may store a variety of data used by at least one component (e.g., the processor 120 or the sensor module 176) of the electronic device 101. For example, data may include software (e.g., the program 140) and input data or output data with respect to commands associated with the software. The memory 130 may include the volatile memory 132 or the nonvolatile memory 134.

The program 140 may be stored in the memory 130 as software and may include, for example, a kernel 142, a middleware 144, or an application 146.

The input device 150 may receive a command or data, which is used for a component (e.g., the processor 120) of the electronic device 101, from an outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 160 may visually provide information to the outside (e.g., the user) of the electronic device 101. For example, the display device 160 may include a display, a hologram device, or a projector and a control circuit for controlling a corresponding device. According to an embodiment, the display device 160 may include a touch circuitry configured to sense the touch or a sensor circuit (e.g., a pressure sensor) for measuring an intensity of pressure on the touch.

The audio module 170 may convert a sound and an electrical signal in dual directions. According to an embodiment, the audio module 170 may obtain the sound through the input device 150 or may output the sound through the sound output device 155 or an external electronic device (e.g., the electronic device 102 (e.g., a speaker or a headphone)) directly or wirelessly connected to the electronic device 101.

The sensor module 176 may generate an electrical signal or a data value corresponding to an operating state (e.g., power or temperature) inside or an environmental state (e.g., a user state) outside the electronic device 101. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support one or more designated protocols to allow the electronic device 101 to connect directly or wirelessly to the external electronic device (e.g., the electronic device 102). According to an embodiment, the interface 177 may include, for example, an HDMI (high-definition multimedia interface), a universal serial bus (USB) interface, a secure digital (SD) card interface, or an audio interface.

A connecting terminal 178 may include a connector that physically connects the electronic device 101 to the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. According to an embodiment, the haptic module 179 may include, for example, a motor, a piezoelectric element, or an electric stimulator.

The camera module 180 may shoot a still image or a video image. According to an embodiment, the camera module 180 may include, for example, at least one or more lenses, image sensors, ISPs, or flashes.

The power management module 188 may manage power supplied to the electronic device 101. According to an embodiment, the power management module 188 may be implemented as at least a part of a PMIC.

The battery 189 may supply power to at least one component of the electronic device 101. According to an embodiment, the battery 189 may include, for example, a non-rechargeable (primary) battery, a rechargeable (secondary) battery, or a fuel cell.

The communication module 190 may establish a direct (e.g., wired) or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the AP) and supporting the direct (e.g., wired) communication or the wireless communication. According to an embodiment, the communication module 190 may include a wireless communication module (or a wireless communication circuit) 192 (e.g., a cellular communication module, a short-range wireless communication module, or a global navigation satellite system (GNSS) communication module) or a wired communication module 194 (e.g., a local area network (LAN) communication module or a power line communication module). The corresponding communication module among the above communication modules may communicate with the external electronic device through the first network 198 (e.g., the short-range communication network such as a Bluetooth, a Wi-Fi direct, or an infrared data association (IrDA) or the second network 199 (e.g., the long-distance wireless communication network such as a cellular network, an internet, or a computer network (e.g., LAN or a wide area network (WAN))). The above-mentioned various communication modules may be implemented into one component (e.g., a single chip) or into separate components (e.g., chips), respectively. The wireless communication module 192 may identify and authenticate the electronic device 101 using user information (e.g., international mobile subscriber identity (IMSI)) stored in the subscriber identification module 196 in the communication network, such as the first network 198 or the second network 199.

The antenna module 197 may transmit or receive a signal or power to or from the outside (e.g., an external electronic device). According to an embodiment, the antenna module may include one antenna including a radiator made of a conductor or conductive pattern formed on a substrate (e.g., a printed circuit board (PCB)). According to an embodiment, the antenna module 197 may include a plurality of antennas. In this case, for example, the communication module 190 may select one antenna suitable for a communication method used in the communication network such as the first network 198 or the second network 199 from the plurality of antennas. The signal or power may be transmitted or received between the communication module 190 and the external electronic device through the selected one antenna. According to some embodiments, in addition to the radiator, other parts (e.g., a radio frequency integrated circuit (RFIC)) may be further formed as a portion of the antenna module 197.

At least some components among the components may be connected to each other through a communication method (e.g., a bus, a general purpose input and output (GPIO), a serial peripheral interface (SPI), or a mobile industry processor interface (MIPI)) used between peripheral devices to exchange signals (e.g., a command or data) with each other.

According to an embodiment, the command or data may be transmitted or received between the electronic device 101 and the external electronic device 104 through the server 108 connected to the second network 199. Each of the electronic devices 101a and 101b may be the same or different types as or from the electronic device 101. According to an embodiment, all or some of the operations performed by the electronic device 101 may be performed by one or more external electronic devices among the external electronic devices 101a, 101b, or 103. For example, when the electronic device 101 performs some functions or services automatically or by request from a user or another device, the electronic device 101 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 101. The electronic device 101 may provide the result as is or after additional processing as at least a part of the response to the request. To this end, for example, a cloud computing, distributed computing, or client-server computing technology may be used.

Figure 2:
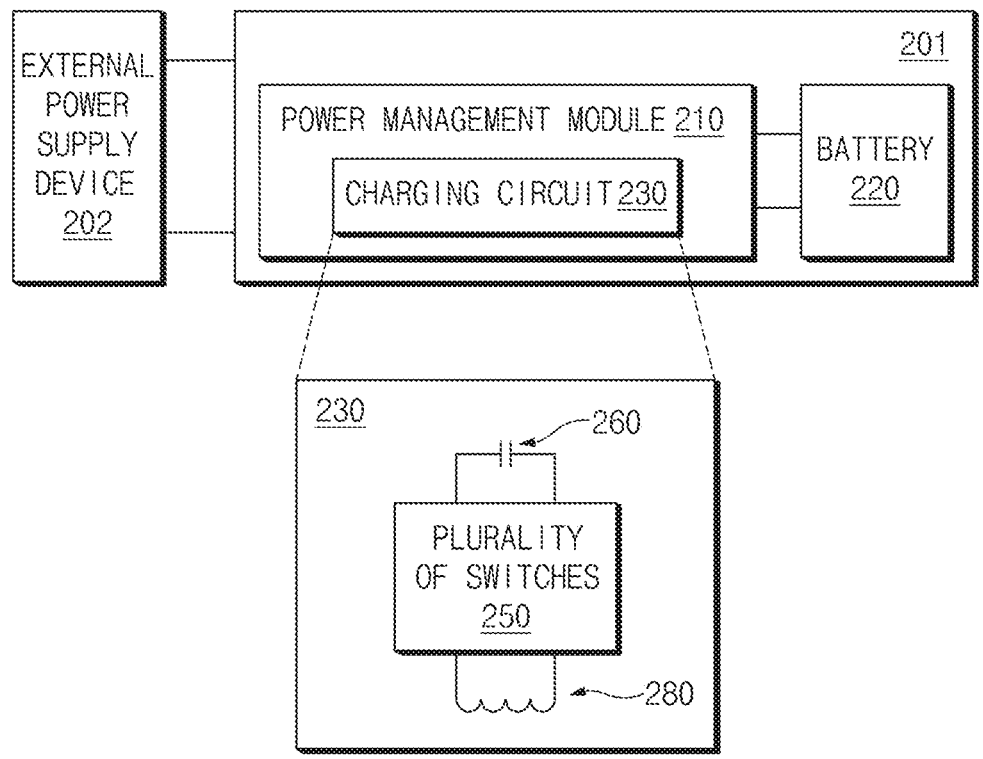
FIG. 2 is a block diagram illustrating a power management module and a battery according to an embodiment.

FIG. 2 illustrates a power management module and a battery according to an embodiment.

Referring to FIG. 2, an electronic device 201 includes a power management module 210 and a battery 220. The power management module 210 (e.g., a charger IC or a PMIC) includes a charging circuit 230, and may control a flow of current output from the battery 220 and/or a flow of current flowing into the battery 220.

The power management module 210 may utilize power received from the battery 220 as a system supply source. The power management module 210 may supply power suitable for a voltage level that is required for each element inside the electronic device 201.

The power management module 210 may charge the battery 220 with power provided from an external power supply device 202. For example, the external power supply device 202 may be a fast charging power adapter, a travel adapter (TA), a battery pack, or a wireless power transmission device (e.g., a wireless charging pad or an electronic device).

The power management module 210 may further include a separate operation element (or a controller) therein. An operation element (e.g., a logic circuit or a micro controller unit (MCU)) inside the power management module 210 may perform operations and controls related to charging or discharging the battery 220. The operation element may directly control a plurality of switches in the charging circuit 230, or may control a plurality of switches in the charging circuit 230 in response to a control signal provided by a processor inside the electronic device 201.

The charging circuit 230 may charge the battery 220 using the power supplied from the external power supply device 202 with respect to the electronic device 201.

The charging circuit 230 includes a plurality of switches 250, a flying capacitor 260, and an inductor 280. The flying capacitor 260 may be used to increase a voltage. The charging circuit 230 may operate as a voltage divider circuit due to a resonance of the flying capacitor 260 and the inductor 280.

The charging circuit 230 may operate in different modes depending on a type of the external power supply device 202.

When the external power supply device 202 supports a direct charging among fast charging methods, the charging circuit 230 may operate in a first mode having a fixed voltage conversion ratio (e.g., about 2:1). Using the direct charging technology, the external power supply device 202 (e.g., a power adapter) performs a constant voltage control or a constant current control on the battery 220 inside the electronic device 201. For example, the electronic device 201 and the external power supply device 202 may transmit and receive signals related to charging of the battery 220 through a power delivery (PD) communication. The external power supply device 202 may perform the constant voltage control or constant current control for charging the battery 220 by using a programmable power supply (PPS) function of a USB PD 3.0.

When the external power supply device 202 supports the direct charging, the constant voltage control or the constant current control inside the external power supply device 202 is performed, and the charging circuit 230 may charge the battery 220 by lowering a voltage, based on the fixed voltage conversion ratio (e.g., about 2:1). In the first mode, the charging circuit 230 may operate with a relatively high charging efficiency (e.g., about 96% or more), and then heat generation of the charging circuit 230 may be reduced. In addition, in the first mode, the charging circuit 230 may have a switching signal having a sine wave characteristic, and then a switching loss may be reduced.

However, when the external power supply device 202 is a legacy power adapter that does not support the direct charging, the charging circuit 230 may operate in the second mode in which a voltage conversion ratio is adjusted depending on a degree of charge of the battery 220. For example, in the second mode, the charging circuit 230 may operate as a 3-level buck converter in which the power conversion ratio is adjusted by a pulse width modulation (PWM) method.

In the second mode, a switching operation of the plurality of switches 250 may be controlled based on the current flowing into the battery 220 or the voltage across both ends of the battery 220. The flying capacitor 260 may operate in one of a charge state, an idle state, or a discharge state depending on the switching of the plurality of switches 250.

The battery 220 may be charged with power provided from the external power supply device 202. The battery 220 may supply power required for an operation of the electronic device 201. The battery 220 may include a lithium-ion battery or a rechargeable battery.

Figure 3:
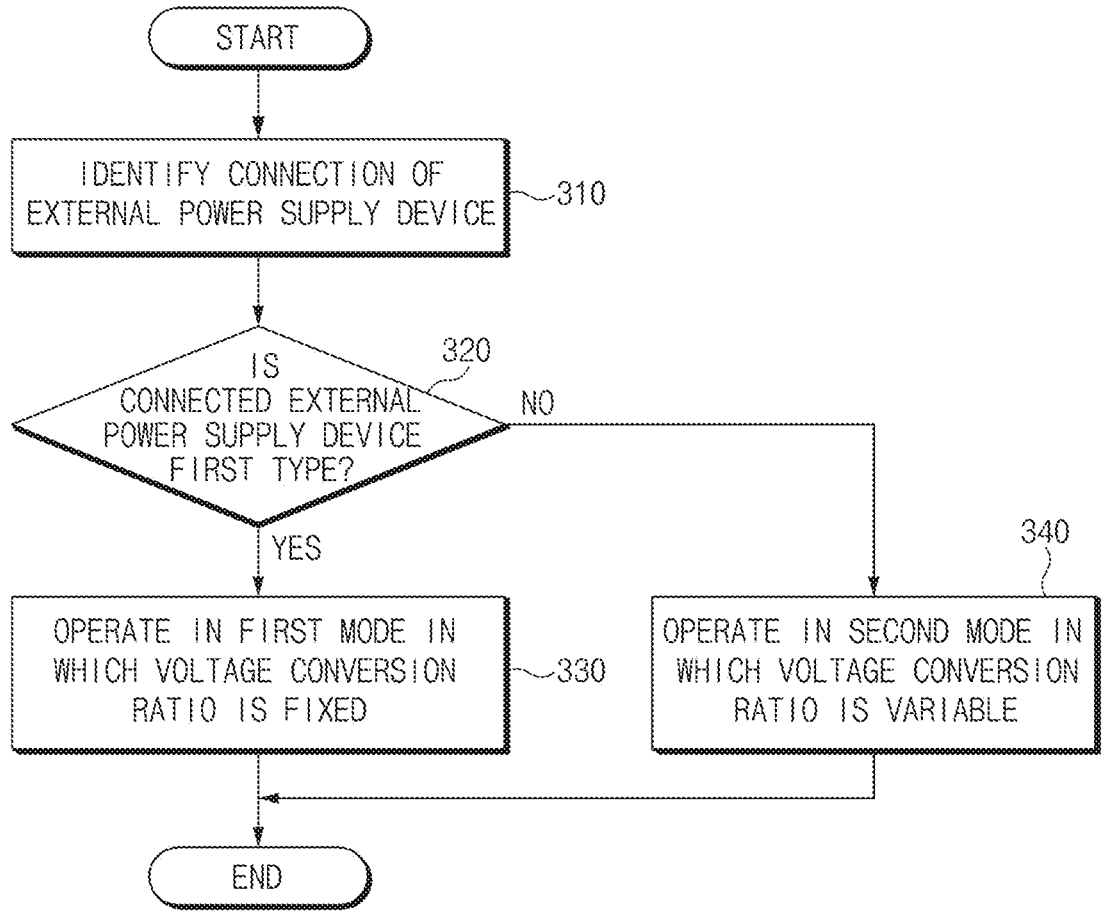
FIG. 3 is a flowchart illustrating a charging method of an electronic device depending on a type of an external power supply device, according to an embodiment.

FIG. 3 is a flowchart illustrating a charging method of an electronic device depending on a type of an external power supply device, according to an embodiment.

Referring to FIG. 3, in step 310, the power management module 210 of the electronic device 201 identifies an electrical connection of the external power supply device 202. The electronic device 201 may be connected to the external power supply device 202 by wired or wirelessly through an interface 177. The power management module 210 may receive power from the external power supply device 202.

In step 320, the power management module 210 determines whether the external power supply device 202 is a first type of the power supply device in which the constant voltage control or the constant current control for charging the battery 220 is performed in the external power supply device 202.

When PD communication is possible with the connected external power supply device 202, the power management module 210 may determine that the external power supply device 202 is the first type of the power supply device. For example, the power management module 210 may determine whether the external power supply device 202 is the first type of the power supply device by using the PPS function of the USB PD 3.0.

However, when the PD communication with the connected external power supply device 202 is not possible, the power management module 210 may determine that the external power supply device 202 is a second type of the power supply device (e.g., the legacy power adapter that does not support the direct charging). The second type of the external power supply device 202 may be a device that cannot perform the constant voltage control or the constant current control for the battery 220 inside the electronic device 201 and provides fixed voltage. For example, the second type of the power supply device may be the legacy power adapter that supplies the fixed voltage of about 5V or 9V. The charging circuit 230 inside the electronic device 201 may change the voltage conversion ratio depending on the degree of charge of the battery 220.

In step 330, when the external power supply device 202 is the first type of the power supply device, the power management module 210 operates the charging circuit 230 in the first mode having the fixed voltage conversion ratio to perform the charging. For example, in the first mode, the voltage conversion ratio of the charging circuit 230 may be fixed to about 2:1. When a maximum current capacity of a standard USB type C cable is 3 A, the first type of the power supply device may supply power to the battery 220 while maintaining a maximum input current of about 3 A or less. The charging circuit 230 having the voltage conversion ratio of 2:1 drops the voltage of power transferred from the power adapter by about ½ and may transfer the current increased by about 2 times to the battery 220. Therefore, while maintaining the maximum current capacity of the standard type C cable, it is possible to charge the battery 220 with a high power. In the first mode, the charging circuit 230 may obtain relatively high efficiency (e.g., about 96% or more) and may perform the fast charging while reducing the heat generation.

In the first mode, the power management module 210 may control switches included in the charging circuit 230, based on a signal with a fixed first duty cycle (e.g., about 50%) and a first frequency (e.g., about 500 kHz). The first frequency may be set to the same value as a resonant frequency of the flying capacitor 260 and the inductor 280 of an output terminal.

The charging circuit 230 may reduce the switching loss by a resonant operation of the flying capacitor 260 and the inductor 280 of the output terminal.

In step 340, when the external power supply device 202 is the second type of the power supply device, the power management module 210 operates the charging circuit 230 in the second mode in which the voltage conversion ratio is adjusted based on the charging ratio of the battery 220 and to perform the charging.

In the second mode, the power management module 210 may control switches included in the charging circuit 230, based on a signal having a second duty cycle that is varied by the PWM method and a second frequency. The second frequency may be greater than the resonant frequency of the flying capacitor 260 and the inductor 280 of the output terminal by about 5 times to 10 times.

The second frequency may be the same as or similar to the resonant frequency (e.g., about 500 kHz) of the flying capacitor 260 and the inductor 280 of the output terminal.

Figure 4:
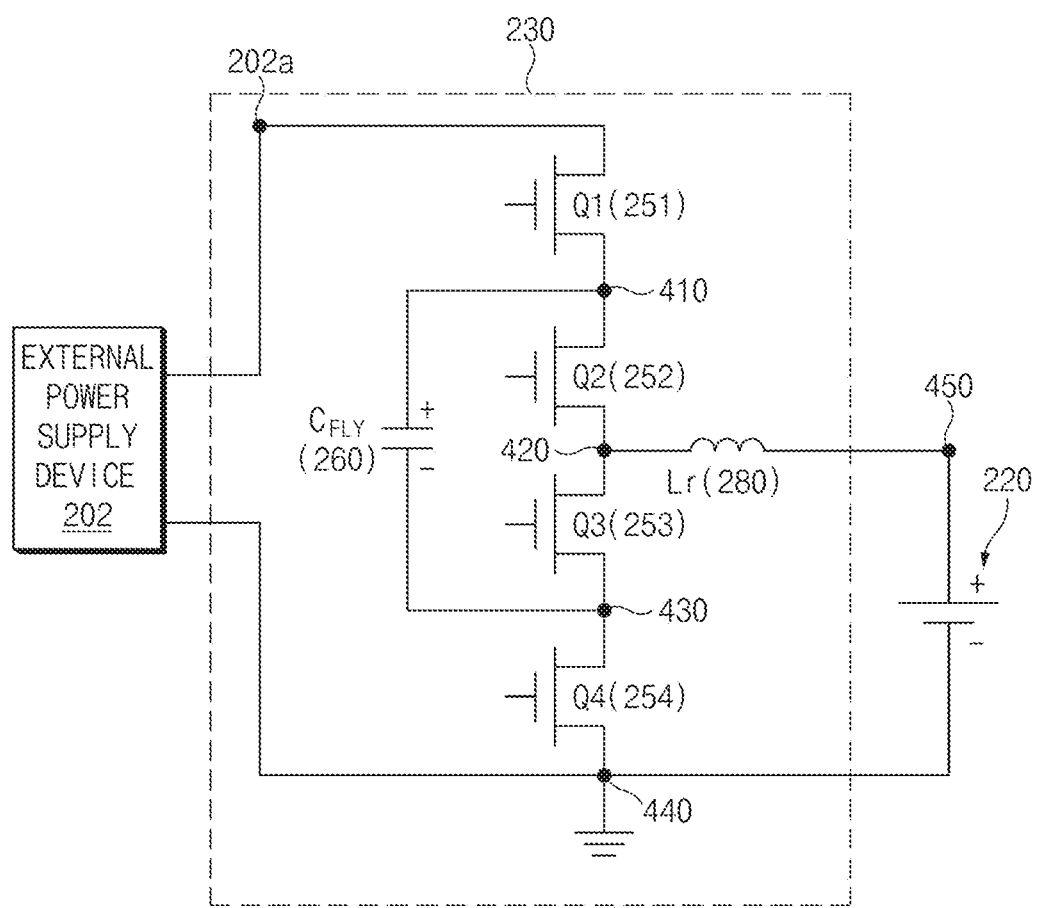
FIG. 4 illustrates a configuration of a charging circuit according to an embodiment.

FIG. 4 illustrates a charging circuit according to an embodiment.

Referring to FIG. 4, the charging circuit 230 may transfer power transferred from the external power supply device 202 to the battery 220. The battery 220 may be charged by the power transferred from the external power supply device 202.

The charging circuit 230 may be configured as a resonant SCVD circuit. The charging circuit 230 includes first to fourth switches 251 to 254, the flying capacitor ($C_{FLY}$) 260, and the inductor ($L_r$) 280.

The first to fourth switches 251 to 254 are sequentially connected. The first switch 251 is electrically connected between a power terminal 202a of the external power supply device 202 and a first node 410. The second switch 252 is electrically connected between the first node 410 and a second node 420. The third switch 253 is electrically connected between the second node 420 and a third node 430. The fourth switch 254 is electrically connected between the third node 430 and a ground terminal 440.

The first to fourth switches 251 to 254 may operate under control of a controller inside the power management module 210 or a processor inside the electronic device 201.

The flying capacitor 260 is electrically connected between the first node 410 and the third node 430.

The inductor 280 is electrically connected between the second node 420 between the second switch 252 and the third switch 253 and a first pole (e.g., + pole) 450 of the battery 220.

The first pole (e.g., + pole) 450 of the battery 220 is electrically connected to the inductor 280, and the second pole (e.g., − pole) is electrically connected to the ground terminal 440.

The charging circuit 230 may operate in the first mode or the second mode depending on the type of the external power supply device 202. The first mode may be a mode operating at the fixed voltage conversion ratio, and the second mode may be a mode operating at the voltage conversion ratio that changes depending on the state of charge of the battery 220.

Figure 5:
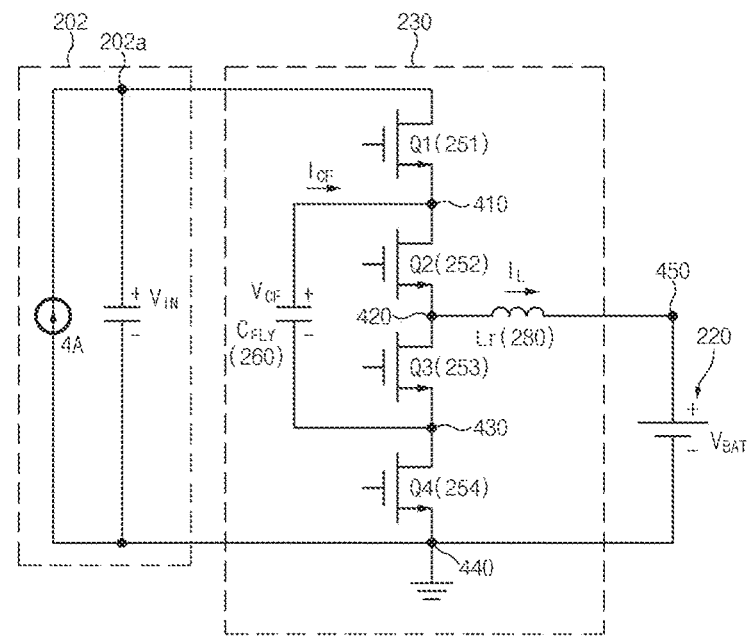
FIG. 5 illustrates an operation in a first mode of a charging circuit according to an embodiment.
Figure 5:
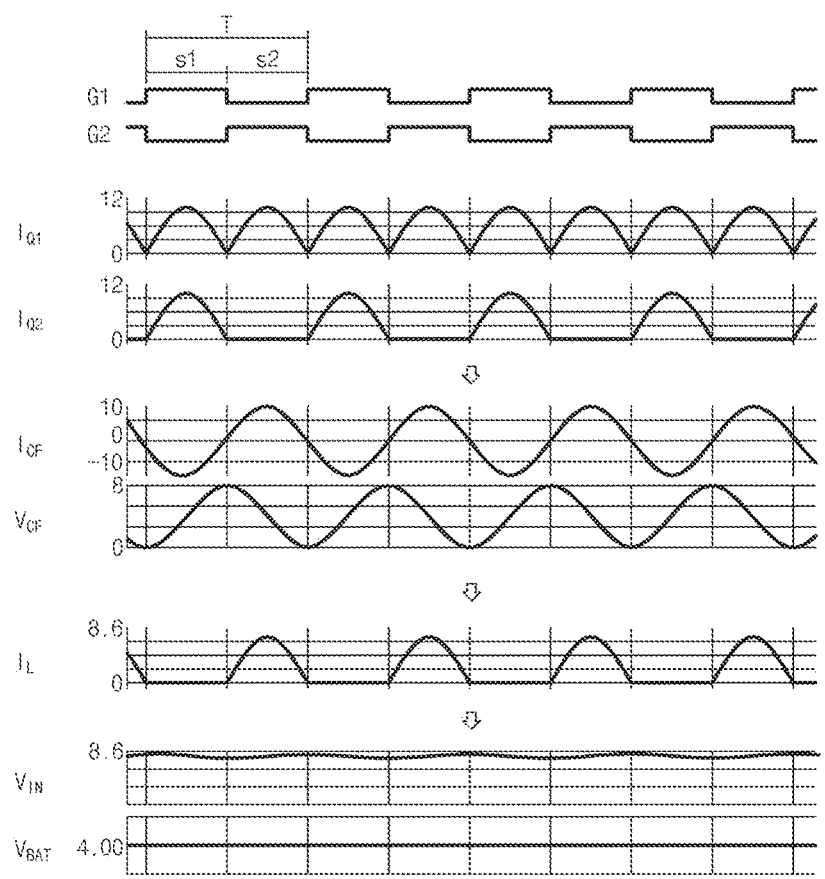

FIG. 5 illustrates a first mode of a charging circuit according to an embodiment.

Referring to FIG. 5, the charging circuit 230 may be connected to the first type of the external power supply device 202 that performs the constant voltage control or the constant current control. For example, the external power supply device 202 may operate as a constant current source.

In the first mode, the charging circuit 230 may operate to have a fixed voltage conversion ratio. In the first mode, the power management module 210 may control the first to fourth switches 251 to 254 by a first control signal G1 or a second control signal G2 of the first frequency (e.g., about 500 kHz) having the fixed duty cycle (e.g., about 50%). The first frequency may be set to the same value as the resonant frequency of the flying capacitor 260 and the inductor 280 of the output terminal.

Due to the resonance of the flying capacitor 260 and the inductor 280 of the output terminal, at least a part of each of the currents (e.g., $I_{Q1}$ and $I_{Q2}$) flowing through the first switch 251 (Q1) and the second switch 252 (Q2) may have a sine wave shape.

A typical SCVD circuit that does not include the inductor 280 uses a flying capacitor having a relatively large capacitance of about 40 uF or more when switching at a frequency of about 500 kHz, whereas the resonant charging circuit 230 including the inductor 280 may use the flying capacitor 260 having a relatively small capacitance of about 1 uF.

In the signal flow diagram, the first switch 251 and the third switch 253 may be operated by the first control signal G1. The first control signal G1 may have the first frequency (e.g., $f_s$=about 500 kHz) equal to the resonant frequency (e.g., $f_R$=about 500 kHz) of the flying capacitor 260 and the inductor 280 of the output terminal. The first control signal G1 may have the fixed duty cycle (e.g., about 50%) in one period T.

The current $I_{Q1}$ flowing through the first switch 251 by the switching may have a half wave shape. Due to the influence of the inductor 280, the current $I_{Q1}$ flowing through the first switch 251 may have the sine wave characteristic rather than an exponentially decreasing form. As a result, a loss due to switching may be reduced.

The second switch 252 and the fourth switch 254 may operate by the second control signal G2. The second control signal G2 may have a phase opposite to that of the first control signal G1. The second control signal G2 may have the first frequency (e.g., about 500 kHz) equal to the resonant frequency of the flying capacitor 260 and the inductor 280 of the output terminal. The second control signal G2 may have the same fixed duty cycle (e.g., about 50%) as the first control signal G1.

The current $I_{Q2}$ flowing through the second switch 252 by the switching may have a half wave shape. The current $I_{Q2}$ flowing through the second switch 252 may be alternating with the current $I_{Q1}$ flowing through the first switch 251. For example, the current $I_{Q1}$ flowing through the first switch 251 may flow in a first period s1 and the current $I_{Q2}$ flowing through the second switch 252 may flow in a second period s2. Due to the influence of the inductor 280, the current $I_{Q2}$ flowing through the second switch 252 may have the sine wave characteristic rather than the exponentially decreasing form. As a result, a loss due to the switching may be reduced.

In the first period s1, the first switch 251 and the third switch 253 may be turned on, and the second switch 252 and the fourth switch 254 may be turned off. In the flying capacitor 260, the current $I_{CF}$ flowing toward the first node 410 may have a negative value. As a result, the flying capacitor 260 may be charged.

A voltage $V_{CF}$ across both ends of the flying capacitor 260 may gradually increase. In the first period s1, the current $I_L$ flowing through the inductor 280 may be '0'. For example, in the first period s1, the battery 220 may be in a state in which it is not charged.

In the second period s2, the first switch 251 and the third switch 253 may be turned off, and the second switch 252 and the fourth switch 254 may be turned on. In the flying capacitor 260, the current $I_{CF}$ flowing toward the first node 410 may have a positive value. As a result, the flying capacitor 260 may be discharged. The voltage $V_{CF}$ across both ends of the flying capacitor 260 may gradually decrease.

In the first period s1 and the second period s2, the current $I_L$ flowing through the inductor 280 may have the positive value. For example, in the first period s1, the battery 220 may be charged by the current $I_{Q1}$ flowing through the first switch 251. In the second period s2, the battery 220 may be charged by the current $I_{Q2}$ flowing through the second switch 252.

By using the above-described switching operation of the first to fourth switches 251 to 254, the voltage $V_{IN}$ of the external power supply device 202 may be about twice $2V_{BAT}$ a voltage $V_{BAT}$ of the battery 220 (about 2:1 voltage conversion ratio).

Figure 6:
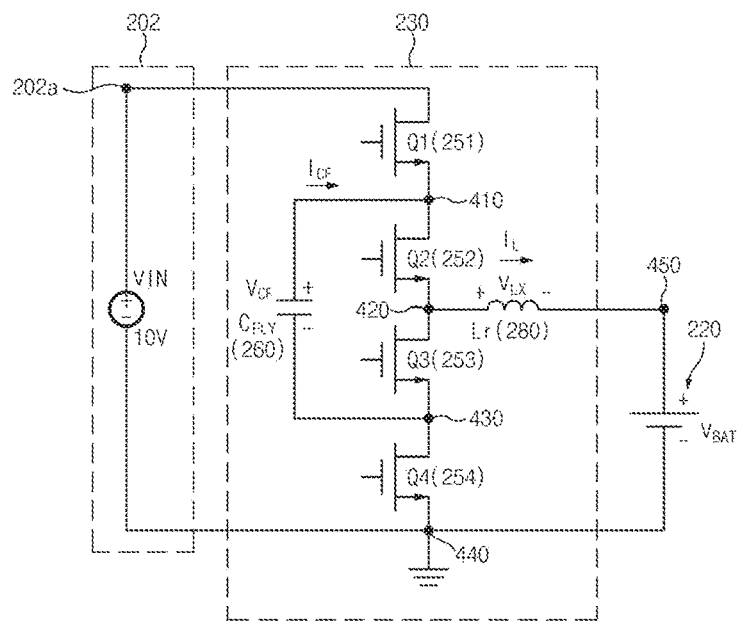
FIG. 6 illustrates an operation in a second mode of a charging circuit according to an embodiment.
Figure 6:
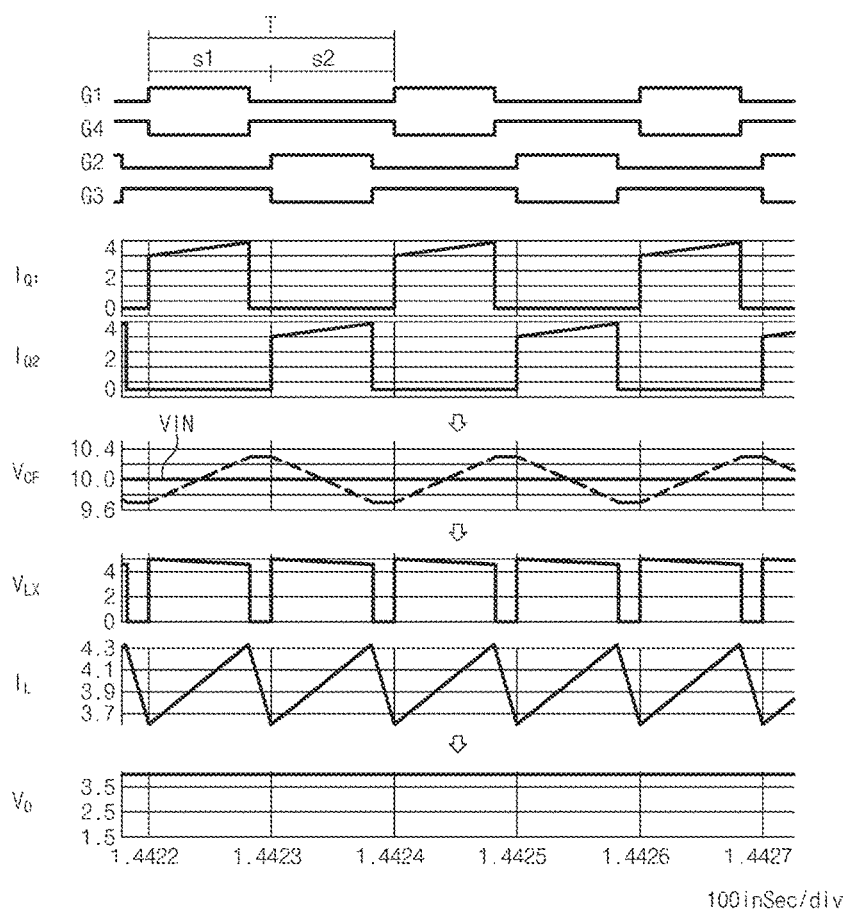

FIG. 6 illustrates a second mode of a charging circuit according to an embodiment.

Referring to FIG. 6, the charging circuit 230 may be connected to the external power supply device 202 that supplies a fixed voltage (e.g., a voltage source of 10V). The charging circuit 230 may operate in the second mode and may change the voltage conversion ratio depending on the degree of charge of the battery 220.

In the second mode, the charging circuit 230 may operate as the 3-level buck converter in which the power conversion ratio is adjusted by the PWM method. The switches inside the charging circuit 230 may be operated by control signals G1, G2, G3, and G4 having a frequency (e.g., about 5 GHz) greater than the resonant frequency of the flying capacitor 260 and the inductor 280 of the output terminal. Through this, the current flowing through the inductor 280 may have a form of linear increase or decrease of a general PWM converter rather than a resonance form.

In the second mode, the charging circuit 230 may change the voltage conversion ratio depending on the duty cycle 'D' of the control signals G1, G2, G3, and G4. For example, a voltage of the battery 220 may be expressed in terms of $V_{BAT}=D^*V_{IN}$ ($V_{BAT}$: the voltage of the battery 220, and $V_{IN}$: the voltage of the external power supply device 202).

In the signal flow diagram, the first switch 251 may operate depending on the first control signal G1, and the second switch 252 may operate depending on the second control signal G2. The third switch 253 may operate depending on the third control signal G3, and the fourth switch 254 may operate depending on the fourth control signal G4. The flying capacitor 260 may operate in one of the charge state, the idle state, or the discharge state depending on the switching of the first to fourth switches 251 to 254. For example, when the first switch 251 and the third switch 253 are turned on, and the second switch 252 and the fourth switch 254 are turned off, the flying capacitor 260 may be in the charge state. When the second switch 252 and the fourth switch 254 are turned on, and the first switch 251 and the third switch 253 are turned off, the flying capacitor 260 may be in the discharge state. Alternatively, when the first switch 251 and the second switch 252 are turned on and the third switch 253 and the fourth switch 254 are turned off, the flying capacitor 260 may be in an idle state.

The first control signal G1 may have a phase opposite to that of the fourth control signal G4.

The second control signal G2 may be a signal in which the first control signal G1 is delayed by a half period T/2. Accordingly, the state of the first control signal G1 may be changed in a first period s1, and the state of the second control signal G2 may be changed in a second period s2.

The second control signal G2 may have a phase opposite to that of the third control signal G3. The current $I_{Q1}$ flowing through the first switch 251 by the switching may operate in response to the first control signal G1. In response to a change in the state of the first control signal G1, the state of the current $I_{Q1}$ flowing through the first switch 251 may be changed.

The current $I_{Q2}$ flowing through the second switch 252 by switching may operate depending on the second control signal G2. The state of the current $I_{Q2}$ flowing through the second switch 252 may be changed, in response to a state change of the second control signal G2.

In the first period s1, the flying capacitor 260 may be charged. The voltage $V_{CF}$ across both ends of the flying capacitor 260 may gradually increase. In the second period s2, the flying capacitor 260 may be discharged. The voltage $V_{CF}$ across both ends of the flying capacitor 260 may gradually decrease.

In each of the first period s1 and the second period s2, a state of a voltage $V_{LX}$ across both ends of the inductor 280 may be changed, and the current $I_L$ flowing through the inductor 280 may have a ripple shape corresponding to a change in the voltage $V_{LX}$ across both ends of the inductor 280.

Figure 7A:
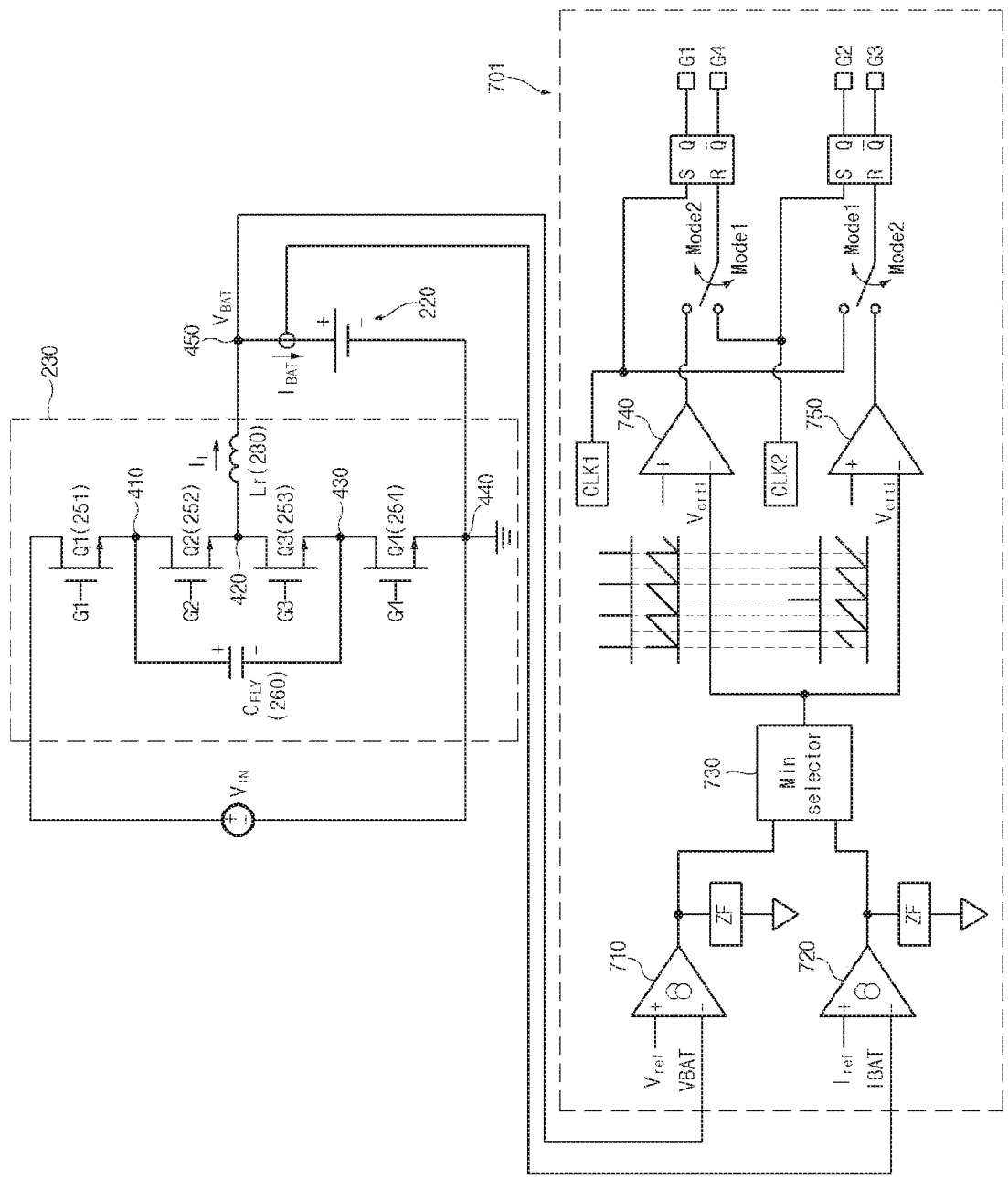
FIG. 7A illustrates a switching control circuit according to an embodiment.

FIG. 7A illustrates a switching control circuit according to an embodiment.

Referring to FIG. 7A, a control circuit 701 is provided to control the charging circuit 230. The control circuit may be included in the power management module 210. The control circuit 701 may generate signals that control the first to fourth switches 251 to 254 of the charging circuit 230.

In the first mode, the control circuit 701 may generate the first control signal G1 for controlling the first switch 251, the second control signal G2 for controlling the second switch 252, the third control signal G3 for controlling the third switch 253, and the fourth control signal G4 for controlling the fourth switch 254, based on a first clock generator CLK1 and a second clock generator CLK2.

In the first mode, the first control signal G1 may be the same as the third control signal G3, and the second control signal G2 may be the same as the fourth control signal G4. In the first mode, the second control signal G2 may have a phase opposite to that of the first control signal G1.

In the first mode, the first control signal G1 and the second control signal G2 may each have the fixed first duty cycle (e.g., about 50%) and the first frequency (e.g., about 500 kHz). The first frequency (e.g., about 500 kHz) may be set to the same value as the resonant frequency of the flying capacitor 260 and the inductor 280 of the output terminal.

In the second mode, the control circuit 701 may determine a duty control voltage $V_{ctrl}$, based on the voltage $V_{BAT}$ across both ends of the battery 220 and a current $I_{BAT}$ flowing into the battery 220.

The control circuit 701 may amplify a voltage difference between the voltage $V_{BAT}$ across both ends of the battery 220 and a set reference voltage $V_{ref}$ through a first error amplifier 710. The control circuit 701 may amplify a current difference between the current $I_{BAT}$ flowing into the battery 220 and a set reference current $I_{ref}$ through a second error amplifier 720. The reference voltage $V_{ref}$ and the reference current $I_{ref}$ may be set in consideration of charging characteristics of the battery 220.

The control circuit 701 may compare an output of the first error amplifier 710 with an output of the second error amplifier 720 through a comparator 730 and may determine the duty control voltage $V_{ctrl}$, based on a relatively small output value.

In FIG. 7A, the duty control voltage $V_{ctrl}$ is determined by using both the voltage $V_{BAT}$ across both ends of the battery 220 and the current $I_{BAT}$ flowing into the battery 220, but the disclosure is not limited thereto. For example, the duty control voltage $V_{ctrl}$ may be determined using one of the voltage $V_{BAT}$ across both ends of the battery 220 and the current $I_{BAT}$ flowing into the battery 220.

In the second mode, the control circuit 701 may generate the first to fourth control signals G1 to G4 by comparing the duty control voltage $V_{ctrl}$ with a first triangle wave, or the duty control voltage $V_{ctrl}$ with a second triangle wave.

Figure 7B:
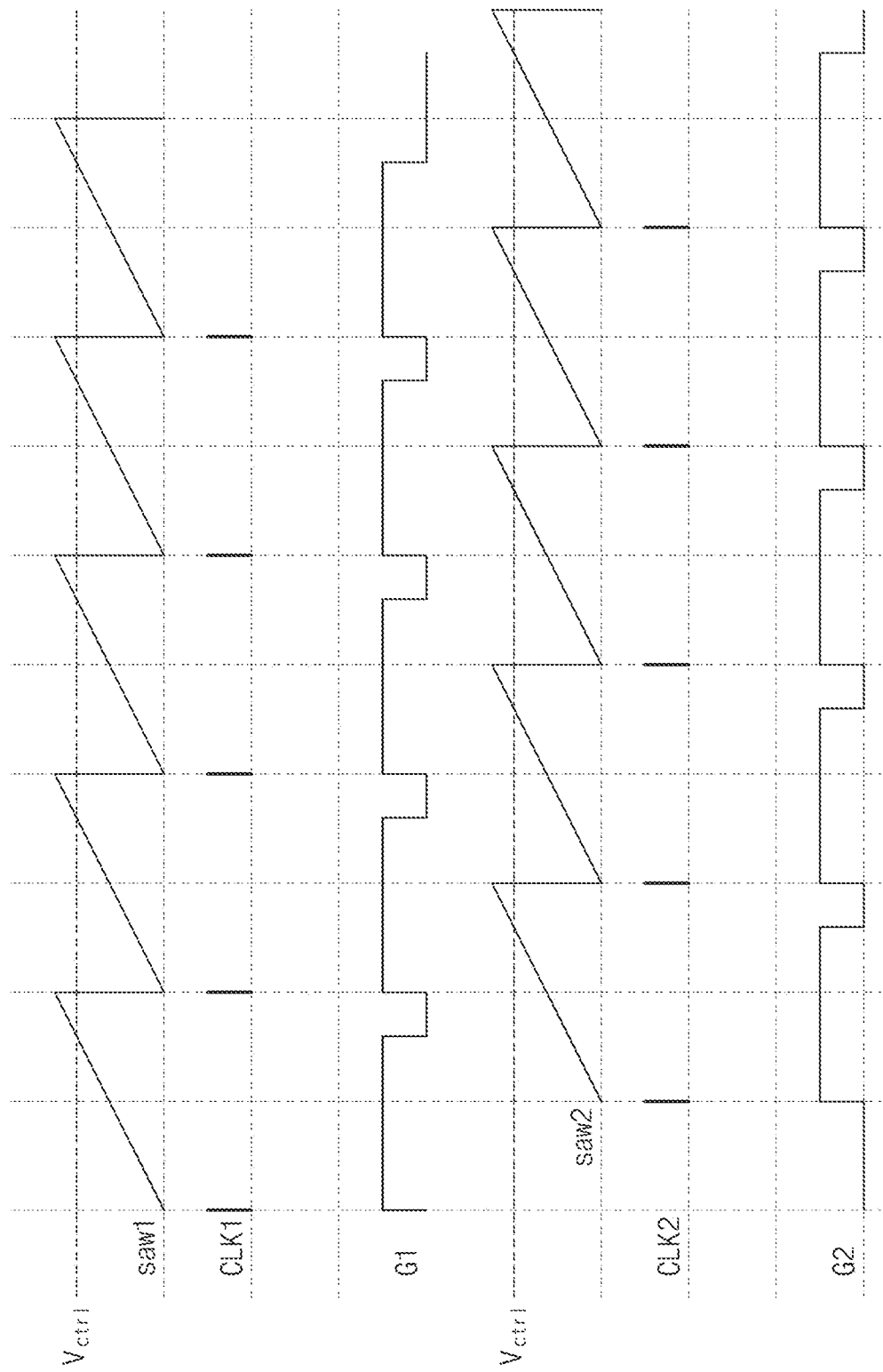
FIG. 7B illustrates a generation of a switching control signal in a second mode according to an embodiment.

FIG. 7B illustrates a switching control signal in a second mode according to an embodiment.

Referring to FIG. 7B, the control circuit 701 may generate the first control signal G1 that controls the first switch 251 by comparing the duty control voltage $V_{ctrl}$ with a first triangle wave $V_{saw1}$. The first triangle wave $V_{saw1}$ may be generated in response to a first clock signal CLK1. The control circuit 701 may allow the first control signal G1 to remain HIGH when the duty control voltage $V_{ctrl}$ is greater than the first triangle wave $V_{saw1}$. The control circuit 701 may allow the first control signal G1 to remain LOW when the duty control voltage $V_{ctrl}$ is less than the first triangle wave $V_{saw1}$.

The fourth control signal G4 that controls the fourth switch 254 may have a phase opposite to that of the first control signal G1. For example, when the duty control voltage $V_{ctrl}$, is greater than the first triangle wave $V_{saw1}$, the control circuit 701 may allow the fourth control signal G4 to remain LOW, and when the duty control voltage $V_{ctrl}$ is less than the first triangle wave $V_{saw1}$, the control circuit 701 may allow the fourth control signal G4 to remain HIGH.

The control circuit 701 may generate the second control signal G2 for controlling the second switch 252 by comparing the duty control voltage $V_{ctrl}$ with a second triangle wave $V_{saw2}$. The second triangle wave $V_{saw2}$ may be generated in response to the second clock signal CLK2. The control circuit 701 may allow the second control signal G2 to remain HIGH when the duty control voltage $V_{ctrl}$ is greater than the second triangle wave $V_{saw2}$. The control circuit 701 may allow the second control signal G2 to remain LOW when the duty control voltage $V_{ctrl}$ is less than the second triangle wave $V_{saw2}$. The second clock signal CLK2 may be a signal delayed by the half period T/2 from the first clock signal CLK1.

The third control signal G3 controlling the third switch 253 may have a phase opposite to that of the second control signal G2. For example, the control circuit 701 may allow the third control signal G3 to remain LOW when the duty control voltage $V_{ctrl}$ is greater than the second triangle wave $V_{saw2}$, and the control circuit 701 may allow the third control signal G3 to remain HIGH when the duty control voltage $V_{ctrl}$ is less than the second triangle wave $V_{saw2}$.

Figure 8:
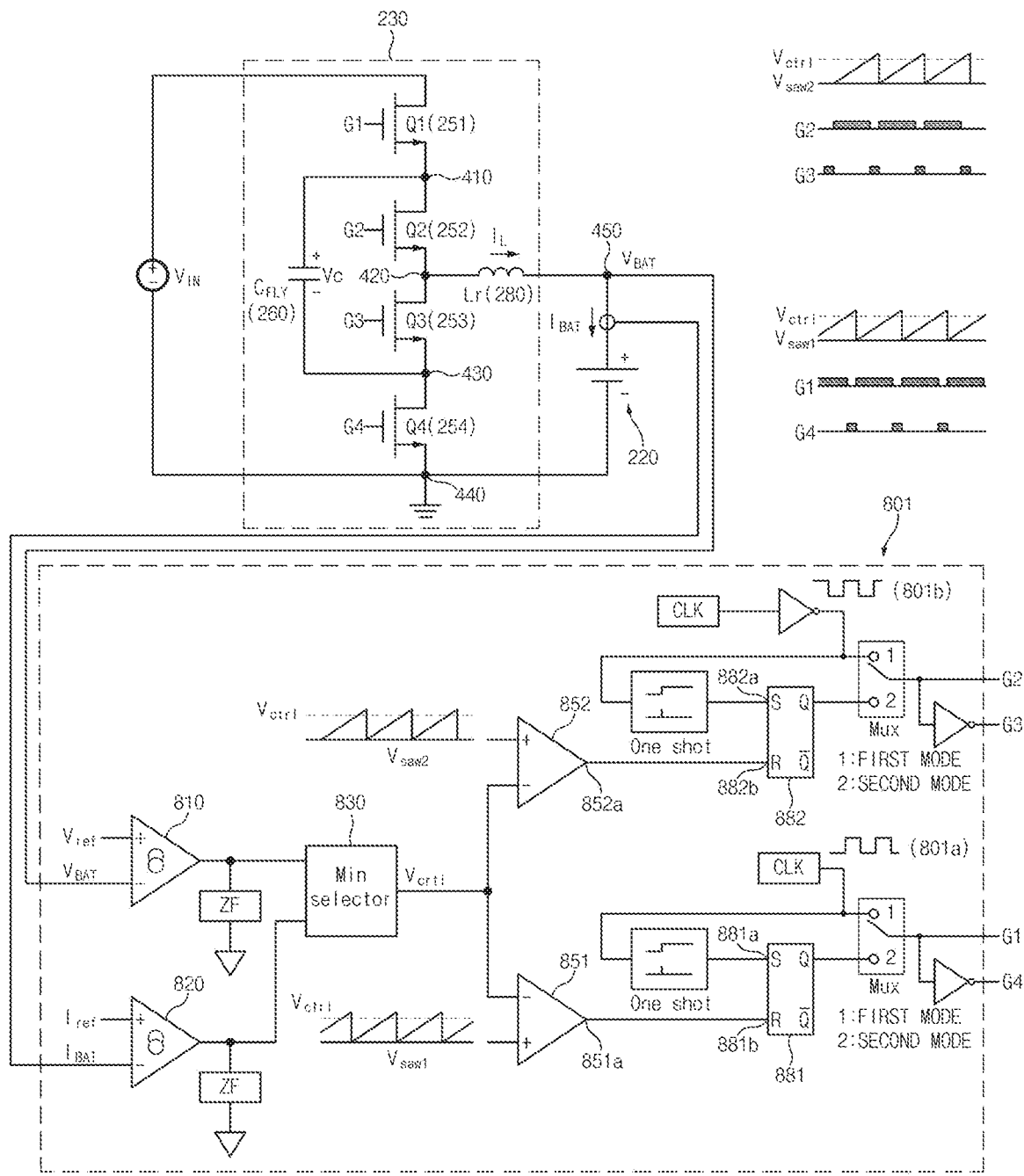
FIG. 8 illustrates a switching control circuit in a second mode according to an embodiment.

FIG. 8 illustrates a switching control circuit in a second mode according to an embodiment.

Referring to FIG. 8, a control circuit 801 is provided to control the charging circuit 230. The control circuit 801 may be included in the power management module 210 and may generate signals for controlling the first to fourth switches 251 to 254 of the charging circuit 230.

In the first mode, the control circuit 801 may generate the first control signal G1 for controlling the first switch, the second control signal G2 for controlling the second switch, the third control signal G3 for controlling the third switch, and the fourth control signal G4 controlling the fourth switch 254, based on a signal 801a of a clock generator CLK and an inverted signal 801b of the clock generator CLK.

In the first mode, the first control signal G1 may be the same as the third control signal G3, and the second control signal G2 may be the same as the fourth control signal G4. The second control signal G2 may have a phase opposite to that of the first control signal G1.

In the first mode, the first control signal G1 and the second control signal G2 may each have the fixed first duty cycle (e.g., about 50%) and the first frequency (e.g., about 500 kHz). The first frequency (e.g., about 500 kHz) may be set to the same value as the resonant frequency of the flying capacitor 260 and the inductor 280 of the output terminal.

In the second mode, the control circuit 801 may determine the duty control voltage $V_{ctrl}$, based on the voltage $V_{BAT}$ across both ends of the battery 220 and the current $I_{BAT}$ flowing into the battery 220.

The control circuit 801 may amplify a voltage difference between the voltage $V_{BAT}$ across both ends of the battery 220 and the set reference voltage $V_{ref}$ through a first error amplifier 810. The control circuit 801 may amplify a current difference between the current $I_{BAT}$ flowing into the battery 220 and the set reference current $I_{ref}$ through the second error amplifier 820. The control circuit 801 may compare an output of the first error amplifier 810 with an output of the second error amplifier 820 through a comparator 830, and may determine the duty control voltage $V_{ctrl}$, based on a relatively small output value.

In FIG. 8, the duty control voltage $V_{ctrl}$ is determined by using both the voltage $V_{BAT}$ across both ends of the battery 220 and the current $I_{BAT}$ flowing into the battery 220 as an example, but the disclosure is not limited thereto. For example, the duty control voltage $V_{ctrl}$ may be determined using one of the voltage $V_{BAT}$ across both ends of the battery 220 and the current $I_{BAT}$ flowing into the battery 220.

In the second mode, the control circuit 801 may generate the first to fourth control signals G1 to G4 using the duty control voltage $V_{ctrl}$ and the first triangle wave $V_{saw1}$, or the duty control voltage $V_{ctrl}$ and the second triangle wave $V_{saw2}$.

The control circuit 801 may generate a first control signal G1 for controlling the first switch 251 by comparing the duty control voltage $V_{ctrl}$ with the first triangle wave $V_{saw1}$.

The control circuit 801 may change the first control signal G1 from a first state (LOW) to a second state (HIGH) in response to the clock signal (CLK) 801a. For example, the control circuit 801 may provide a toggling signal of the clock signal CLK to an S input 881a of a flip-flop 881. The control circuit 801 may allow the first control signal G1 to maintain the second state (HIGH) when the duty control voltage $V_{ctrl}$ is greater than the first triangle wave $V_{saw1}$.

The control circuit 801 may change the first control signal G1 from the second state (HIGH) to the first state (LOW) when the duty control voltage $V_{ctrl}$ is less than the first triangle wave $V_{saw1}$. For example, the control circuit 801 may provide a signal from an output terminal 851a of a coupler 851 that couples the duty control voltage $V_{ctrl}$ and the first triangle wave $V_{saw1}$ to an R input 881b of the flip-flop 881.

The control circuit 801 may generate the second control signal G2 for controlling the second switch 252 by comparing the duty control voltage $V_{ctrl}$ with the second triangle wave $V_{saw2}$. The second triangle wave $V_{saw2}$ may be a signal in which the first triangle wave $V_{saw1}$ is shifted by half a period.

The control circuit 801 may change the second control signal G2 from the first state (LOW) to the second state (HIGH) in response to an inverted signal 801b of the clock signal CLK. For example, the control circuit 801 may provide the inverted signal 801b of the clock signal CLK to an S input 882a of a flip-flop 882. The control circuit 801 may allow the second control signal G2 to maintain the second state (HIGH) when the duty control voltage $V_{ctrl}$ is greater than the second triangle wave $V_{saw2}$.

When the duty control voltage $V_{ctrl}$ is less than the second triangle wave $V_{saw2}$, the control circuit 801 may change the second control signal G2 from the second state (HIGH) to the first state (LOW). For example, the control circuit 801 may provide a signal from an output terminal 852a of a coupler 852 that couples the duty control voltage $V_{ctrl}$ and the second triangle wave $V_{saw2}$ to an R input 882b of the flip-flop 882.

The control circuit 801 may generate the fourth control signal G4 by inverting a phase of the first control signal G1. The control circuit 801 may generate the third control signal G3 by inverting a phase of the second control signal G2.

Figure 9:
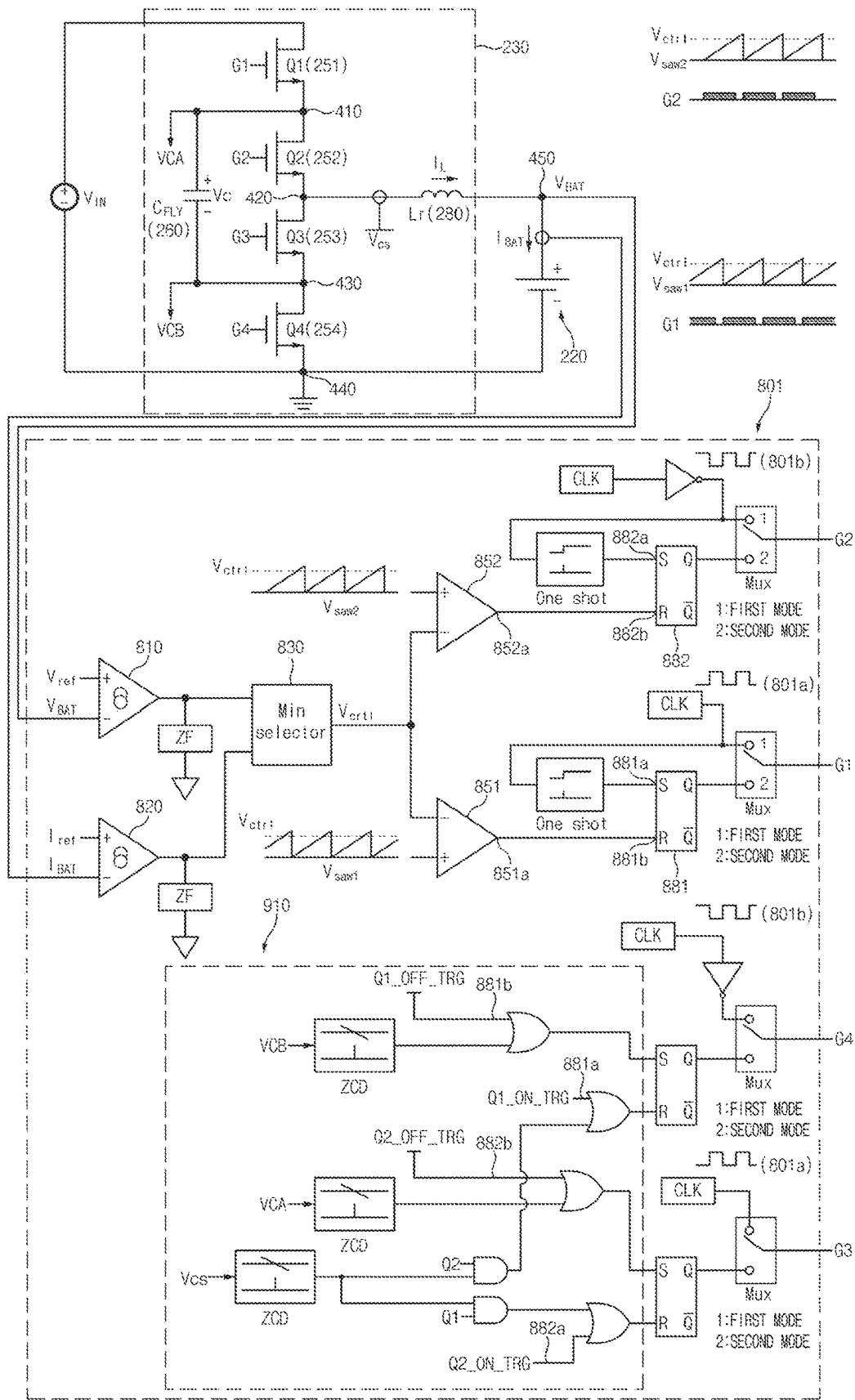
FIG. 9 illustrates a control circuit utilizing a voltage across both ends of a flying capacitor, according to an embodiment.

FIG. 9 illustrates a control circuit utilizing a voltage across both ends of a flying capacitor, according to an embodiment.

Referring to FIG. 9, compared to FIG. 8, in the power management module 210, the control circuit 801 that controls the charging circuit 230 additionally includes a voltage detector 910. The voltage detector 910 may control a switching operation of the third switch 253 or the fourth switch 254 to increase switching efficiency.

In the second mode, the power management module 210 may set the switching frequency equal to or similar to the resonant frequency (e.g., about 500 kHz) of the flying capacitor 260 and the inductor 280 of the output terminal by using the voltage detector 910.

The voltage detector 910 may control the switching operation of the third switch 253 or the fourth switch 254 by using a voltage Vc across both ends of the flying capacitor 260. The voltage detector 910 may adjust a turn-on timing of the third switch 253 or a turn-on timing of the fourth switch 254, depending on whether the voltage Vc across both ends of the flying capacitor 260 is clamped to a ground voltage 0V or the input voltage $V_{IN}$.

For example, a turn-on time of the third switch 253 may be determined by a relatively faster one of a time point at which the voltage VCA of the first node 410 crosses to '0' (or a time point at which the voltage Vc across both ends of the flying capacitor 260 is clamped to the ground voltage) and a time point at which the second switch 252 is turned off (e.g., a time point at which a signal is provided to the R input 882b of the flip-flop 882).

A turn-on time of the fourth switch 254 may be determined by a relatively faster one of a time point at which the voltage VCB of the third node 430 crosses to '0' (or a time point at which the voltage Vc across both ends of the flying capacitor 260 is clamped to the input voltage $V_{IN}$) and a time point at which the first switch 251 is turned off (e.g., a time point at which a signal is provided to the R input 881b of the flip-flop 881).

The voltage detector 910 may control the switching operation of the third switch 253 or the fourth switch 254 by using a time point at which when a current flowing through the inductor 280 (hereinafter, an inductor current $I_L$) (or a sensing voltage Vcs proportional to the inductor current $I_L$) becomes '0'.

For example, a turn-off time of the third switch 253 may be determined by a relatively faster one of a time point at which the second switch 252 is turned on (e.g., a time point at which a signal is provided to the S input 882a of the flip-flop 882) and a time point at which the inductor current $I_L$ becomes '0' (or a time point at which the sensing voltage Vcs crosses to '0') while the first switch 251 is conducting (turned on). As a result, it is possible to prevent the inductor current $I_L$ from falling below '0'.

A turn-off time of the fourth switch 254 may be determined by a relatively faster one of a time point at which the first switch 251 is turned on (e.g., a time point at which a signal is provided to the S input 881a of the flip-flop 881) and a time point at which the inductor current $I_L$ becomes '0' (or a time point at which the sensing voltage Vcs crosses to '0') while the second switch 252 is conducting (turned on). As a result, it is possible to prevent the inductor current $I_L$ from falling below '0'.

Figure 10:
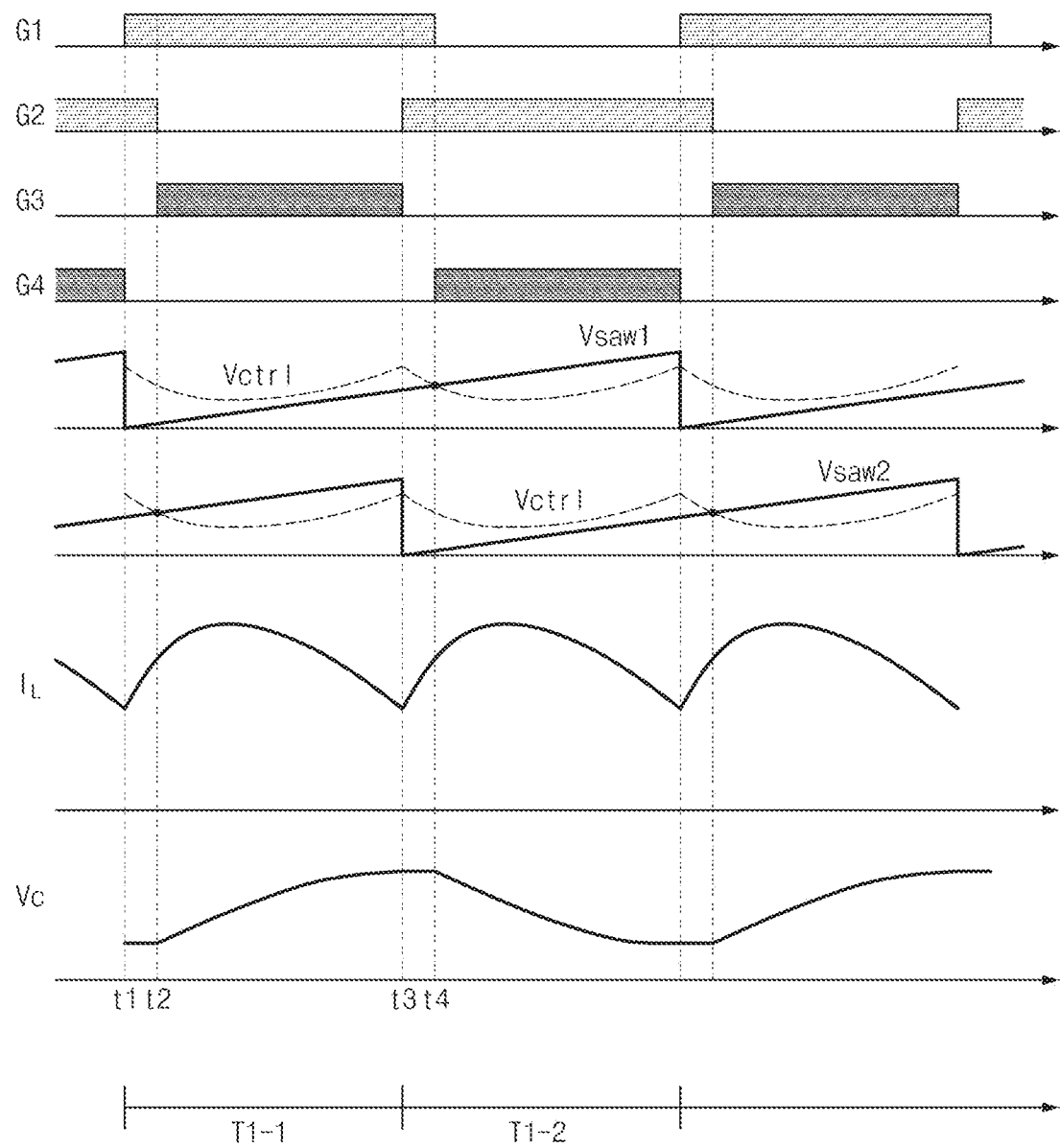
FIG. 10 is a diagram illustrating a change in a switching signal of a voltage control method in a first state of a second mode according to an embodiment.

FIG. 10 illustrates a change in a switching signal of a voltage control method in a first state of a second mode according to an embodiment.

Referring to FIG. 10, in the first state, the inductor current $I_L$ exceeds '0' and clamping does not occur in the voltage across both ends of the flying capacitor 260.

The turn-on time and the turn-off time of the first switch 251 may be determined by the duty control voltage $V_{ctrl}$ and the first triangle wave $V_{saw1}$. For example, the first switch 251 may be turned on at a first time t1 when the first triangle wave $V_{saw1}$ is less than the duty control voltage $V_{ctrl}$. The second switch 252 may be in ON state at the first time t1. The first switch 251 may be turned off at a fourth time t4 when the first triangle wave $V_{saw1}$ becomes greater than the duty control voltage $V_{ctrl}$. At the fourth time t4, the second switch 252 may be in ON state.

The turn-on time and the turn-off time of the second switch 252 may be determined by the duty control voltage $V_{ctrl}$ and the second triangle wave $V_{saw2}$. The second triangle wave $V_{saw2}$ may be a signal in which the first triangle wave $V_{saw1}$ is shifted by a half period (e.g., a first half period T1-1). For example, the second switch 252 may be turned off at a second time t2 when the second triangle wave $V_{saw2}$ is greater than the duty control voltage $V_{ctrl}$. At the second time t2, the first switch 251 may be in ON state. The second switch 252 may be turned on at a third time t3 when the second triangle wave $V_{saw2}$ is less than the duty control voltage $V_{ctrl}$. At the third time t3, the first switch 251 may be in ON state.

In the first half period T1-1 of the first triangle wave $V_{saw1}$, the first switch 251 is turned on (occurs at the first time t1) and the second switch 252 is turned off (occurs at the second time t2). In the second half cycle T1-2 of the first triangle wave $V_{saw1}$, the second switch 252 is turned on (occurs at the third time t3), and the first switch 251 is turned off (occurs at the fourth time t4).

The control signal G3 of the third switch 253 may have a form opposite to the control signal G2 of the second switch 252. Accordingly, the third switch 253 may be turned off when the second switch 252 is turned on, and may be turned on when the second switch 252 is turned off.

The control signal G4 of the fourth switch 254 may have a form opposite to the control signal G1 of the first switch 251. Accordingly, the fourth switch 254 may be turned off when the first switch 251 is turned on, and may be turned on when the first switch 251 is turned off.

Turn-off timings of the third switch 253 and the fourth switch 254 may be changed to prevent the inductor current $I_L$ from falling below '0'. The turn-on timings of the third switch 253 and the fourth switch 254 may be changed by clamping of the flying capacitor 260.

Figure 11:
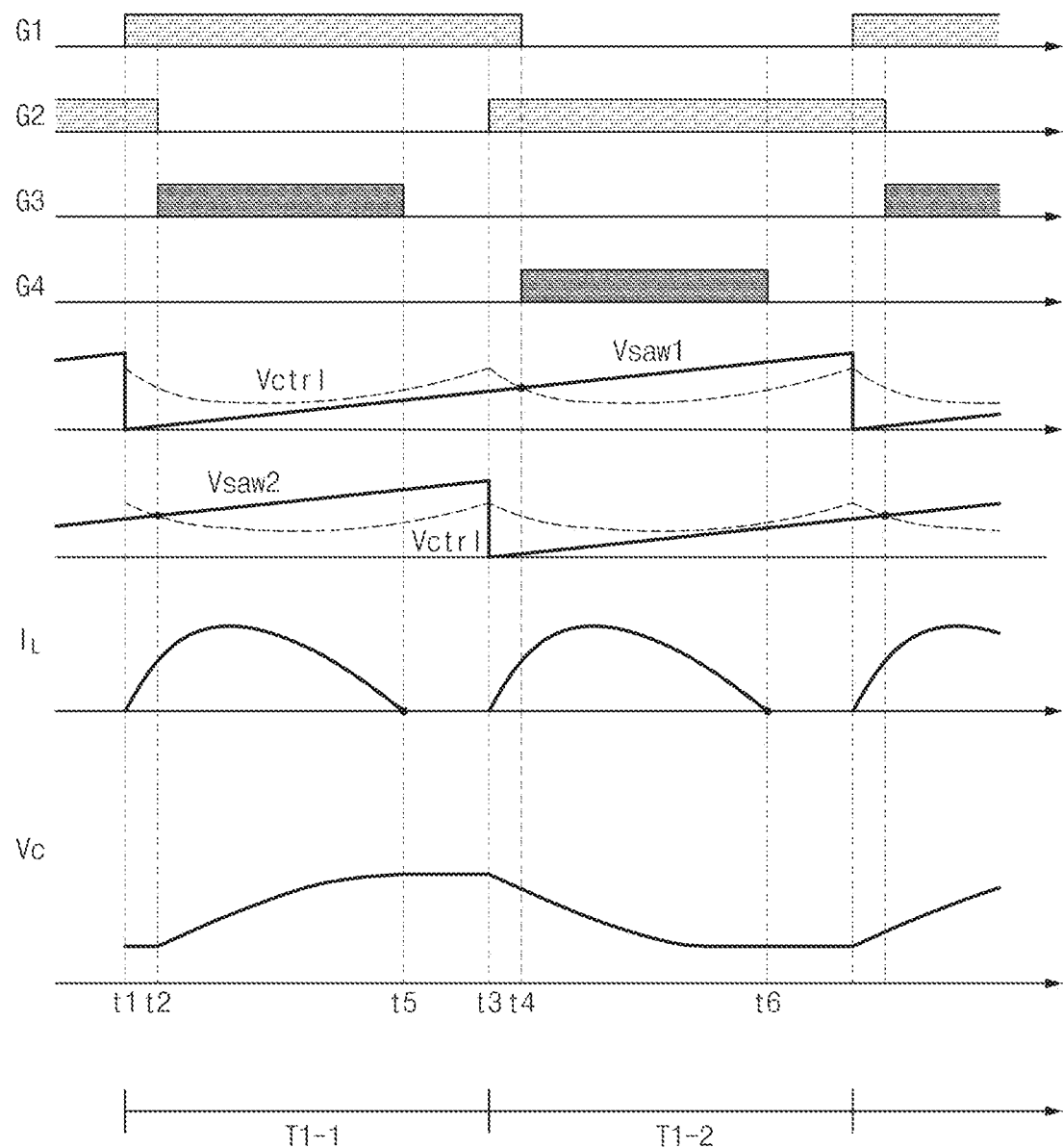
FIG. 11 is a diagram illustrating a change in a switching signal of a voltage control method in a second state of a second mode according to an embodiment.

FIG. 11 illustrates a change in a switching signal of a voltage control method in a second state of a second mode according to an embodiment.

Referring to FIG. 11, in the second state, a zero current period of the inductor current $I_L$ (e.g., a period in which $I_L$ is '0') is included, and clamping does not occur in the voltage across both ends of the flying capacitor 260. For example, the inductor current $I_L$ may be changed depending on a load (e.g., the battery 220).

When the load decreases, a discontinuous conduction mode (DCM) in which there is a period in which the inductor current $I_L$ becomes '0' may be operated (the second state). Since a period in which the current value of the inductor current $I_L$ becomes '0' is decreased as the load increases, a continuous conduction mode (CCM) in which the zero current period does not exist may be operated (the first state).

In the second state, the switching operation of the first switch 251 and the second switch 252 may be the same as that of FIG. 10 associated with the first state, as described above.

In the second state, the turn-on time of the third switch 253 may be the same as the turn-off time of the second switch 252, and the turn-on time of the fourth switch 254 may be the same as the turn-off time of the first switch 251. The turn-on timing of the third switch 253 and the fourth switch 254 may be changed by clamping of the voltage across both ends of the flying capacitor 260.

The control circuit 801 may control the turn-off timing of the third switch 253 or the fourth switch 254 by using a time point at which the inductor current $I_L$ becomes '0'. In this case, the third switch 253 or the fourth switch 254 may operate as an ideal diode. As a result, it is possible to prevent the inductor current $I_L$ from becoming a negative value.

In the first half period T1-1 of the first triangle wave $V_{saw1}$, when the first switch 251 is in the turned on state at a fifth time t5 and the inductor current $I_L$ becomes '0', the third switch 253 may be turned off. Accordingly, the third switch 253 may be turned off before the second switch 252 is turned on.

When the second switch 252 is in the turned on state at a sixth time t6 and the inductor current $I_L$ becomes '0' in a second half period T1-2 of the first triangle wave $V_{saw1}$, the fourth switch 254 may be turned off. Accordingly, the fourth switch 254 may be turned off before the first switch 251 is turned on.

Figure 12:
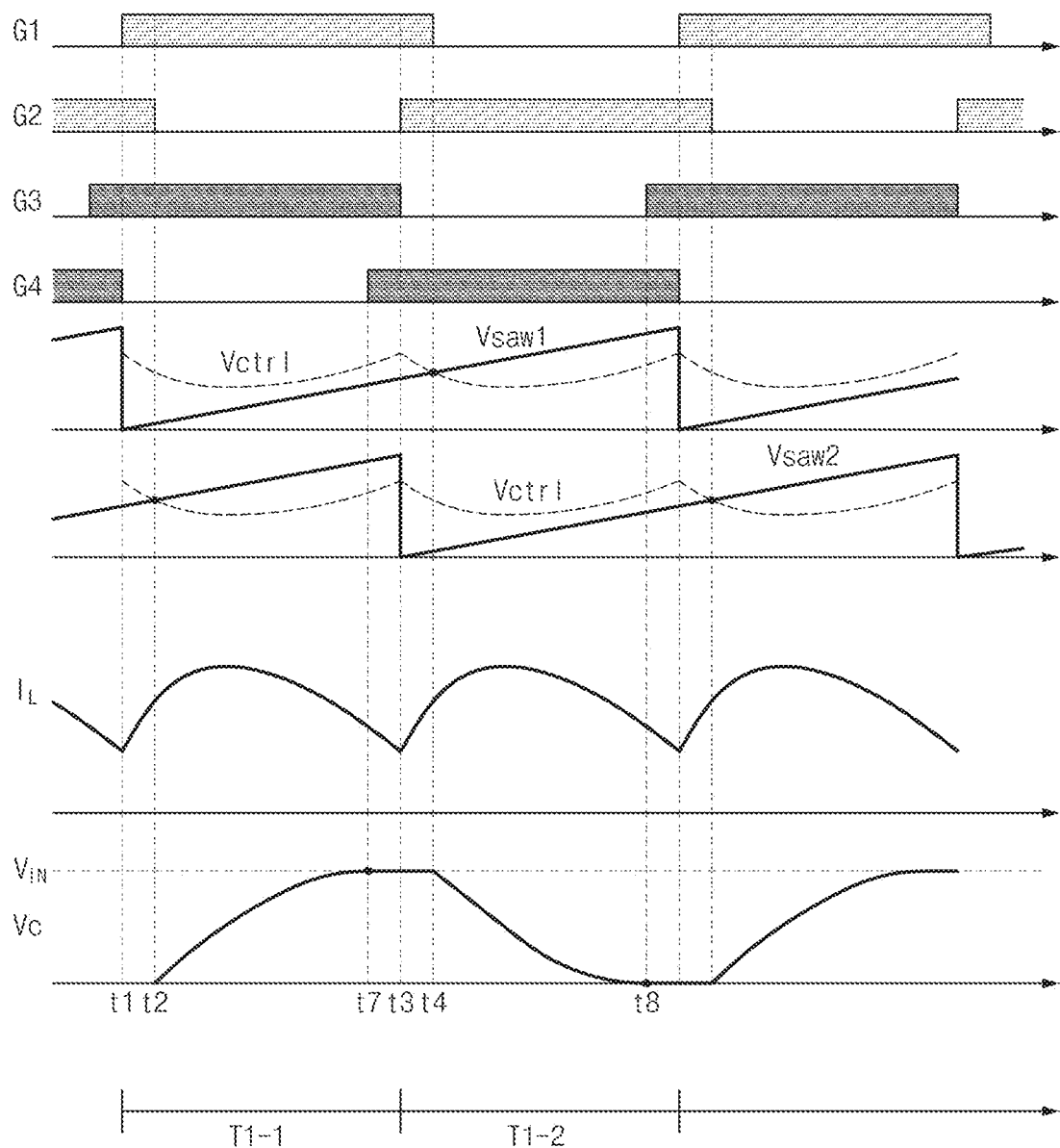
FIG. 12 is a diagram illustrating a change in a switching signal of a voltage control method in a third state of a second mode according to an embodiment.

FIG. 12 illustrates a change in a switching signal of a voltage control method in a third state of a second mode according to an embodiment.

Referring to FIG. 12, in the third state, the voltage across both ends of the flying capacitor 260 is clamped without including the zero current period of the inductor current $I_L$ (e.g., a period in which $I_L$ is '0').

In the third state, the switching operation of the first switch 251 and the second switch 252 may be the same as that of FIG. 10 associated with the first state, as described above.

The control circuit 801 may control the turn-on timing of the third switch 253 or the fourth switch 254 by using a time point at which the voltage Vc across both ends of the flying capacitor 260 is clamped to the input voltage $V_{IN}$ or the ground voltage 0V. When the voltage across both ends of the flying capacitor 260 is clamped to the input voltage $V_{IN}$ or the ground voltage 0V, if the third switch 253 and the fourth switch 254 are not turned on, and the current may flow through body diodes inside the third switch 253 and the fourth switch 254, and switching loss may increase. When the voltage across both ends of the flying capacitor 260 is clamped to the input voltage $V_{IN}$ or the ground voltage 0V, the control circuit 801 may reduce losses due to current flowing through the body diodes inside the third switch 253 and the fourth switch 254 by turning on the third switch 253 and the fourth switch 254.

Because the voltage of the flying capacitor 260 is in a floating state, the control circuit 801 may detect a zero crossing point of the upper voltage VCA (the voltage of the first node 410) of the flying capacitor 260 and a zero crossing point of the lower voltage VCB (the voltage of the third node 430) without directly detecting the voltage Vc across both ends of the flying capacitor 260, and may determine the turn-on time of the third switch 253 and the fourth switch 254.

In the first half-period T1-1 of the first triangle wave $V_{saw1}$, the fourth switch 254 may be turned on at a seventh time t7 when the voltage VCB of the third node 430 crosses to '0' (the voltage Vc across both ends of flying capacitor 260 being clamped to the input voltage $V_{IN}$). Accordingly, the fourth switch 254 may be turned on before the first switch 251 is turned off. The seventh time t7 may be a time point when the body diode inside the fourth switch 254 starts to conduct.

In the second half period T1-2 of the first triangle wave $V_{saw1}$, the third switch 253 may be turned on at an eighth time t8 when the voltage VCA of the first node 410 crosses to '0' (the voltage Vc across both ends of the flying capacitor 260 being clamped to the ground voltage 0V). Accordingly, the third switch 253 may be turned on before the second switch 252 is turned off. The eighth time t8 may be a time point at which the body diode inside the third switch 253 starts to conduct.

The turn-off time of the third switch 253 may be the same as the turn-on time of the second switch 252, and the turn-off time of the fourth switch 254 may be the same as the turn-on time of the first switch 251.

Figure 13:
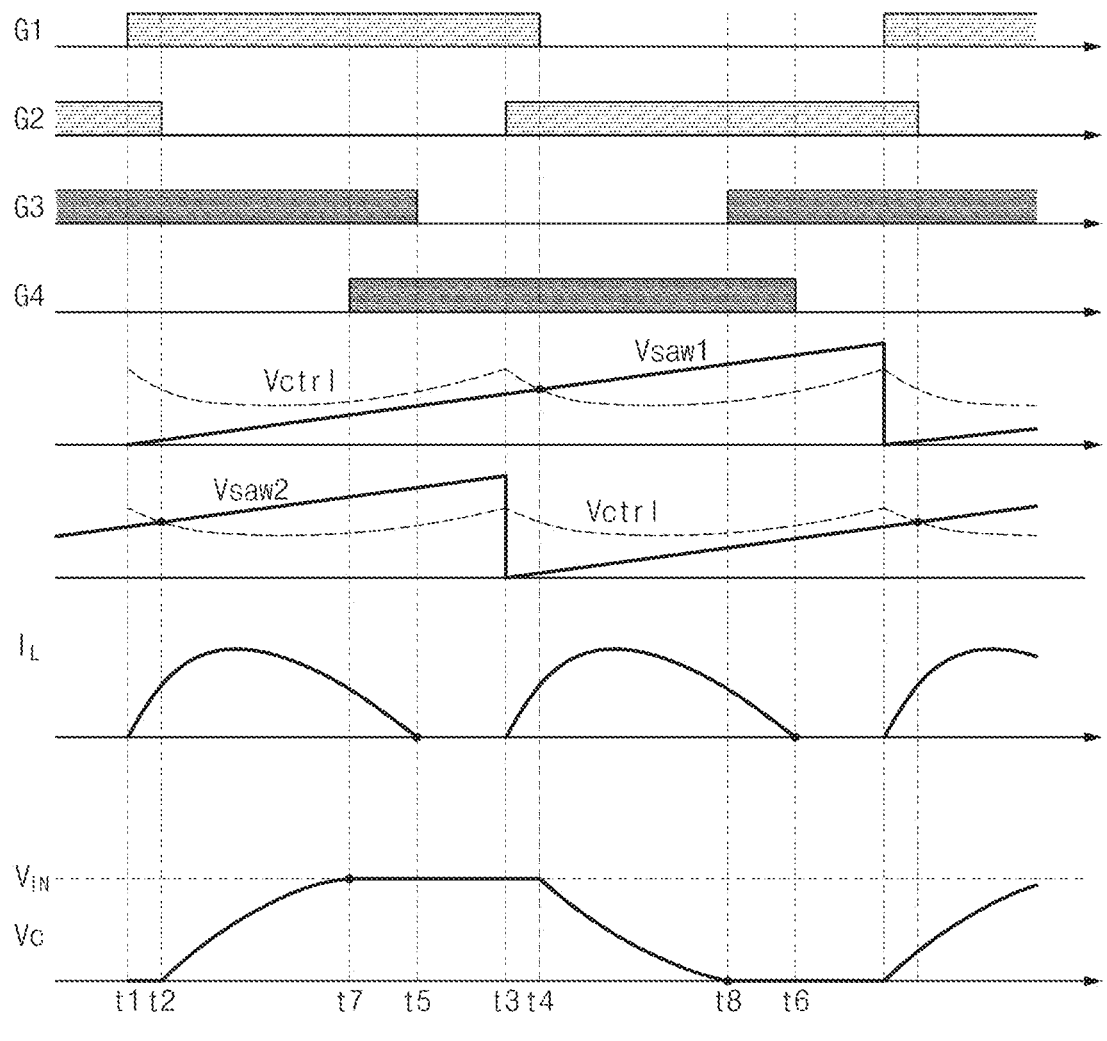
FIG. 13 is a diagram illustrating a change in a switching signal of a voltage control method in a fourth state of a second mode according to an embodiment.

FIG. 13 illustrates a change in a switching signal in a fourth state of a second mode according to an embodiment.

Referring to FIG. 13, in the fourth state, the zero current period of the inductor current $I_L$ (e.g., a period in which $I_L$ is '0') is included, and clamping occurs in the voltage across both ends of the flying capacitor 260.

In the fourth state, the switching operation of the first switch 251 and the second switch 252 may be the same as that of FIG. 10 associated with the first state, as described above.

A turn-on operation of the third switch 253 and the fourth switch 254 may be changed at a time point at which the voltage Vc of both ends of the flying capacitor 260 is clamped to the input voltage $V_{IN}$ or the ground voltage 0V. The turn-on operation of the third switch 253 and the fourth switch 254 may be the same as that of FIG. 12, and a turn-off operation of the third switch 253 and the fourth switch 254 may be the same as that of FIG. 11.

In the first half period T1-1 of the first triangle wave $V_{saw1}$, the fourth switch 254 may be turned on at the seventh time t7 when the voltage VCB of the third node 430 crosses to '0' (the voltage Vc across both ends of the flying capacitor 260 being clamped to the input voltage $V_{IN}$). The fourth switch 254 may be turned on before the first switch 251 is turned off.

In the first half period T1-1 of the first triangle wave $V_{saw1}$, when the first switch 251 is in the turned on state at the fifth time t5 and the inductor current $I_L$ becomes '0', the third switch 253 may be turned off. The third switch 253 may be turned off before the second switch 252 is turned on.

In the second half period T1-2 of the first triangle wave $V_{saw1}$, the third switch 253 may be turned on at the eighth time t8 when the voltage VCA of the first node 410 crosses to '0' (the voltage Vc of both ends of the flying capacitor 260 being clamped to the ground voltage 0V). The third switch 253 may be turned on before the second switch 252 is turned off.

In the second half period T1-2 of the first triangle wave $V_{saw1}$, when the second switch 252 is in the turned on state at the sixth time t6 and the inductor current $I_L$ is '0' (e.g., the sensing voltage Vcs is '0'), the fourth switch 254 may be turned off. The fourth switch 254 may be turned off before the first switch 251 is turned on.

Figure 14:
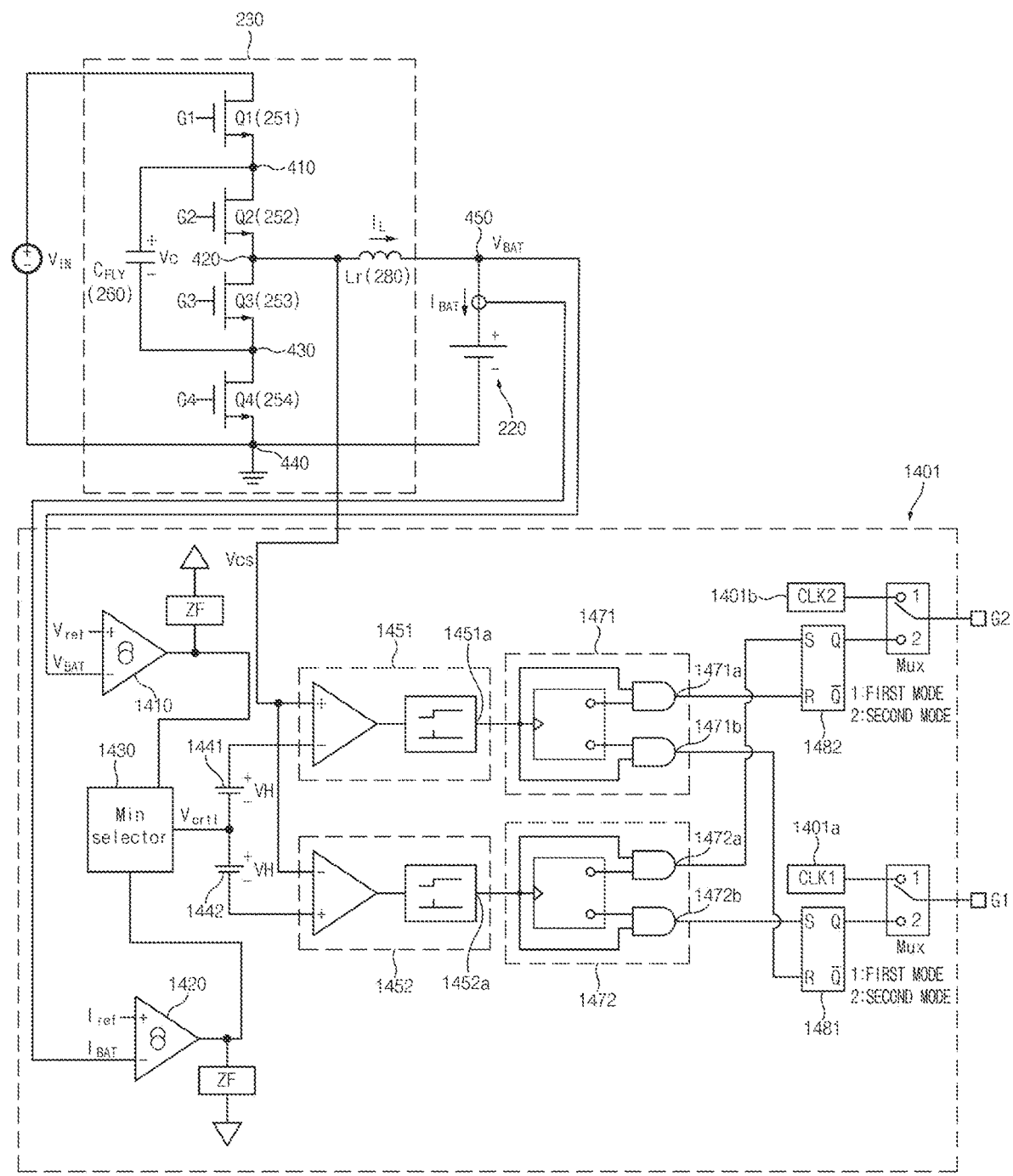
FIG. 14 illustrates a switching control circuit of a current control method in a second mode according to an embodiment.

FIG. 14 illustrates a switching control circuit of a current control method in a second mode according to various embodiments.

Referring to FIG. 14, in the second mode, the voltage conversion ratio of the charging circuit 230 may be adjusted based on the degree of charge of the battery 220. For example, in the second mode, the charging circuit 230 may operate as the 3-level buck circuit in which the power conversion ratio is adjusted in the PWM method. In the second mode, the charging circuit 230 may operate depending on the degree of charge of the battery 220.

In the second mode, the switching operation of the plurality of switches 251 to 254 of the charging circuit 230 may be controlled based on the current flowing into the battery 220 or the voltage across both ends of the battery 220. The flying capacitor 260 of the charging circuit 230 may operate in one of the charge state, the idle state, or the discharge state depending on the switching of the plurality of switches 251 to 254.

A control circuit 1401 may generate signals for controlling the first to fourth switches 251 to 254.

In the first mode, the control circuit 1401 may generate the first control signal G1 by using a signal of a first clock generator 1401a (CLK1) having a 50% duty cycle. The control circuit 1401 may generate the second control signal G2 for controlling the second switch, based on a signal of a second clock generator 1401b (CLK2) having a 50% duty cycle. The signal of the second clock generator 1401b (CLK2) may be obtained by inverting the signal of the first clock generator 1401a (CLK1).

In the first mode, the third control signal G3 may be the same as the first control signal GL. The fourth control signal G4 that controls the fourth switch 254 may be the same as the second control signal G2. The second control signal G2 may have a phase opposite to that of the first control signal G.

In the first mode, the first control signal G1 and the second control signal G2 may each have the fixed first duty cycle (e.g., about 50%) and the first frequency (e.g., about 500 kHz). The first frequency (e.g., about 500 kHz) may be set to the same value as the resonant frequency of the flying capacitor 260 and the inductor 280 of the output terminal.

In the second mode, the control circuit 1401 may determine the duty control voltage $V_{ctrl}$, based on the voltage $V_{BAT}$ across both ends of the battery 220 and the current $I_{BAT}$ flowing into the battery 220.

The control circuit 1401 may amplify a voltage difference between the voltage $V_{BAT}$ across both ends of the battery 220 and the set reference voltage $V_{ref}$ through a first error amplifier 1410. The control circuit 1401 may amplify a current difference between the current $I_{BAT}$ flowing into the battery 220 and the set reference current $I_{ref}$ through a second error amplifier 1420. The control circuit 1401 may compare an output of the first error amplifier 1410 with an output of the second error amplifier 1420 through a comparator 1430, and may determine the duty control voltage $V_{ctrl}$, based on a relatively smaller value.

In FIG. 14, the duty control voltage $V_{ctrl}$ is determined by using both the voltage $V_{BAT}$ across both ends of the battery 220 and the current $I_{BAT}$ flowing into the battery 220, but the disclosure is not limited thereto. For example, the duty control voltage $V_{ctrl}$ may be determined using one of the voltage $V_{BAT}$ across both ends of the battery 220 and the current $I_{BAT}$ flowing into the battery 220.

In the second mode, the control circuit 1401 may control the first to fourth switches 251 to 254 in a current mode control method, based on the inductor current $I_L$ flowing through the inductor 280 included in the charging circuit 230. The control circuit 1401 may adjust the switching frequency of the first to fourth switches 251 to 254 by using the sensing voltage Vcs proportional to the detected inductor current $I_L$. The current control method using the inductor current $I_L$ may provide more precise switching control than the voltage control method described with reference to FIG. 8.

When using the inductor current $I_L$ in the second mode, the switching frequency of the first to fourth switches 251 to 254 may be the same as or similar to the switching frequency in the first mode. Accordingly, in the second mode of the current mode control method, a power conversion efficiency may be relatively high, and an EMI reduction and a system efficiency may be improved by the operation of the resonant converter. In addition, in the second mode of the current mode control method, the switching frequency is automatically reduced depending on load fluctuations, thereby improving efficiency under light load.

The control circuit 1401 may apply a hysteresis voltage VH to the duty control voltage $V_{ctrl}$. The control circuit 1401 may input a first band voltage (hereinafter, a band upper limit voltage) ($V_{ctrl}$+VH) that is generated by adding the hysteresis voltage VH 1441 to the duty control voltage $V_{ctrl}$ to a first cross detector 1451. The control circuit 1401 may input a second band voltage (hereinafter, a band lower limit voltage) ($V_{ctrl}$-VH) that is generated by lowering the hysteresis voltage VH 1442 from the duty control voltage $V_{ctrl}$ to a second cross detector 1452.

The control circuit 1401 may change the hysteresis voltage VH to determine a switching frequency and a ripple of the inductor current $I_L$. For example, the control circuit 1401 may change the hysteresis voltage VH (e.g., 1441 and/or 1442) by using a phase-locked loop (PLL) circuit.

The control circuit 1401 may generate the inductor sensing voltage Vcs generated based on the inductor current $I_L$. The inductor current $I_L$ and the inductor sensing voltage Vcs may have a linear relationship (Vcs=k*$I_L$). The inductor sensing voltage Vcs may be determined by a time point when a sensing signal of the inductor current $I_L$ reaches the band upper limit voltage and the band lower limit voltage, respectively.

The inductor sensing voltage Vcs may be input to the first cross detector 1451 and the second cross detector 1452. The first cross detector 1451 may generate a first trigger signal through an output terminal 1451a at a timing when the inductor sensing voltage Vcs and the band upper limit voltage $V_{ctrl}$+VH are the same. The second cross detector 1452 may generate a second trigger signal through an output terminal 1452a at a timing when the inductor sensing voltage Vcs and the band lower limit voltage $V_{ctrl}$-VH are the same.

The control circuit 1401 may turn on the first switch 251 and the second switch 252 at different timings, based on the second trigger signal. For example, the first switch 251 may be turned on by the second trigger signal in the first period of the inductor sensing voltage Vcs, and the second switch 252 may be turned on by the second trigger signal in the second period (a subsequent period following the first period) of the inductor sensing voltage Vcs.

The control circuit 1401 may turn off the first switch 251 and the second switch 252 at different timings, based on the first trigger signal. In the previous example, the first switch 251 may be turned off by the first trigger signal in the second period of the inductor sensing voltage Vcs, and the second switch 252 may be turned off by the first trigger signal in a third period (a subsequent period following the second period) of the inductor sensing voltage Vcs.

A first signal divider 1471 may receive the first trigger signal through the output terminal 1451a of the first cross detector 1451. The first signal divider 1471 may include a toggle flip-flop that operates by using the first trigger signal as a clock signal. A first output terminal 1471a of the first signal divider 1471 may generate a signal for turning off the second switch 252. The first output terminal 1471a may be connected to an R terminal of a set-reset (SR) flip-flop 1482 that generates the second control signal G2. A second output terminal 1471b of the first signal divider 1471 may generate a signal for turning off the first switch 251. For example, the second output terminal 1471b of the first signal divider 1471 may be connected to the R terminal of an SR flip-flop 1481 that generates the first control signal G1.

A second signal divider 1472 may receive the second trigger signal through the output terminal 1452a of the second cross detector 1452. The second signal divider 1472 may include a toggle flip-flop that operates by using the second trigger signal as a clock signal.

A first output terminal 1472a of the second signal divider 1472 may generate a signal for turning on the second switch 252. For example, the first output terminal 1472a may be connected to the S terminal of the SR flip-flop 1482 that generates the second control signal G2.

A second output terminal 1472b of the second signal divider 1472 may generate a signal for turning on the first switch 251. For example, the second output terminal 1472b of the second signal divider 1472 may be connected to the S terminal of the SR flip-flop 1481 that generates the first control signal G1.

Figure 15:
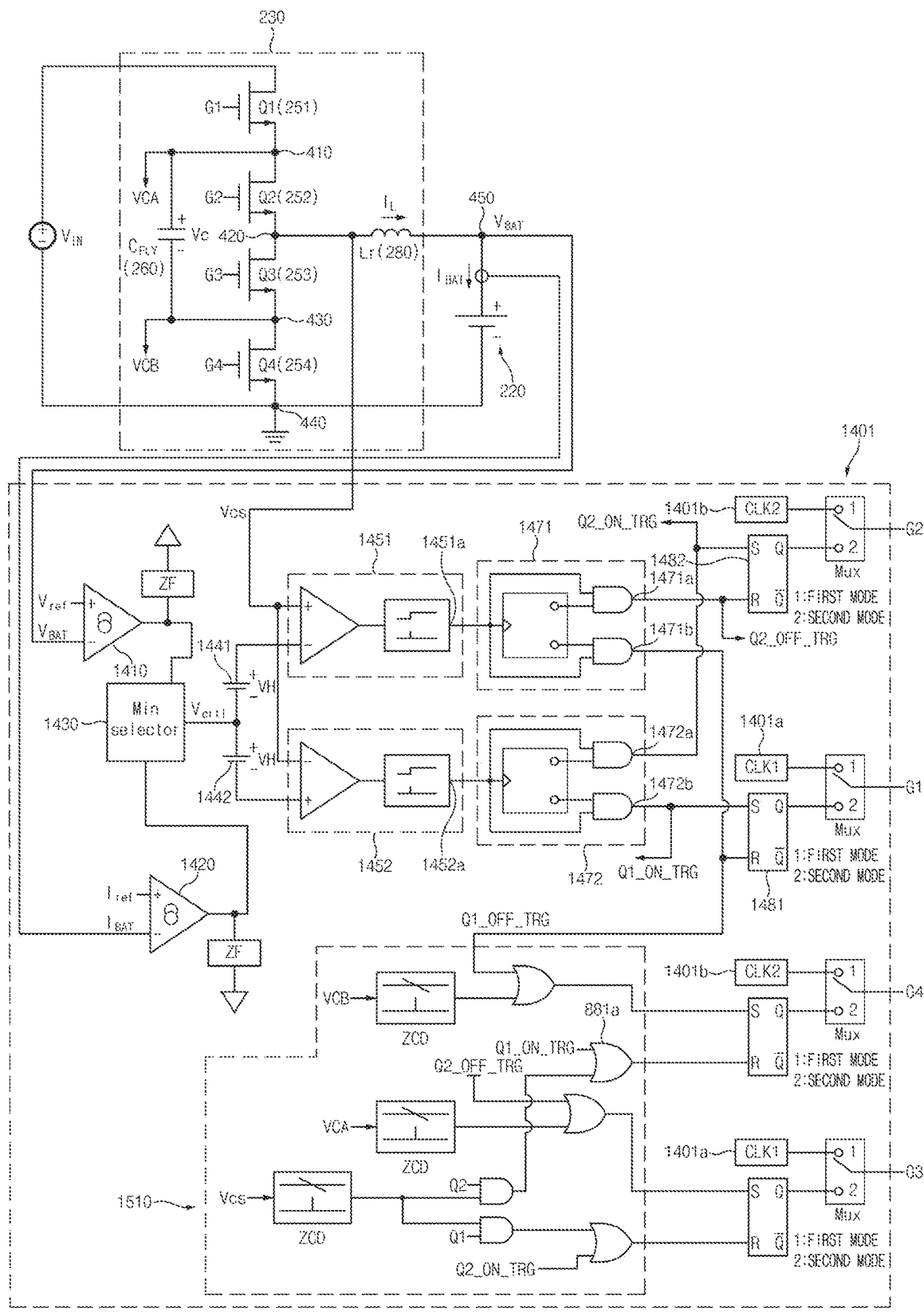
FIG. 15 illustrates a control circuit utilizing a voltage across both ends of a flying capacitor according to an embodiment.

FIG. 15 illustrates a control circuit utilizing a voltage across both ends of a flying capacitor according to an embodiment.

Referring to FIG. 15, compared to FIG. 14, the control circuit 1401 further include a voltage detector 1510.

The voltage detector 1510 may control a switching operation of the third switch 253 or the fourth switch 254 by using the voltage Vc across of both ends of the flying capacitor 260. In addition, the voltage detector 1510 may control the switching operation of the third switch 253 or the fourth switch 254 by using a time point when the sensing voltage Vcs becomes '0'.

The voltage detector 1510 may control the switching operation of the third switch 253 or the fourth switch 254 by using the voltage Vc across both ends of the flying capacitor 260. The voltage detector 1510 may adjust the turn-on timing of the third switch 253 or the turn-on timing of the fourth switch 254 depending on whether the voltage Vc across both ends of the flying capacitor 260 is clamped to the ground voltage 0V or the input voltage $V_{IN}$.

The turn-on timing of the third switch 253 may be determined by a relatively faster one of a time point at which the voltage VCA of the first node 410 crosses to '0' (or a time point at which the voltage $V_{CF}$ across both ends of the flying capacitor 260 is clamped to the ground voltage) and a point at which the second switch 252 is turned off (e.g., a time point at which a signal is provided to the first output terminal 1471a of the first signal divider 1471).

The turn-on time of the fourth switch 254 may be determined by a relatively faster one of a time point at which the voltage VCB of the third node 430 crosses to '0' (or a time point at which the voltage $V_{CF}$ across both ends of the flying capacitor 260 is clamped to the input voltage $V_{IN}$) and a time point at which the first switch 251 is turned off (e.g., a time point at which a signal is provided to the second output terminal 1471b of the first signal divider 1471).

The voltage detector 1510 may control the switching operation of the third switch 253 or the fourth switch 254 by using a time point at which the inductor current $I_L$ flowing through the inductor 280 (or the sensing voltage Vcs proportional to the inductor current $I_L$) becomes '0'.

The turn-off time of the third switch 253 may be determined by a relatively faster one of a time point at which the second switch 252 is turned on (e.g., a time point at which a signal is provided to the first output terminal 1472a of the second signal divider 1472) and a time point at which the inductor current $I_L$ crosses to '0' while the first switch 251 is conducting (turn-on) (a time point at which the sensing voltage Vcs crosses to '0'). As a result, it is possible to prevent the inductor current $I_L$ from falling below '0'.

The turn-off time of the fourth switch 254 may be determined by a relatively faster one of a time point at which the first switch 251 is turned on (e.g., a time point at which a signal is provided to the second output terminal 1472b of the second signal divider 1472) and a time point at which the inductor current $I_L$ crosses to '0' while the second switch 252 is conducting (turn-on) (a time point at which the sensing voltage Vcs crosses to '0'). As a result, it is possible to prevent the inductor current $I_L$ from falling below '0'.

Figure 16:
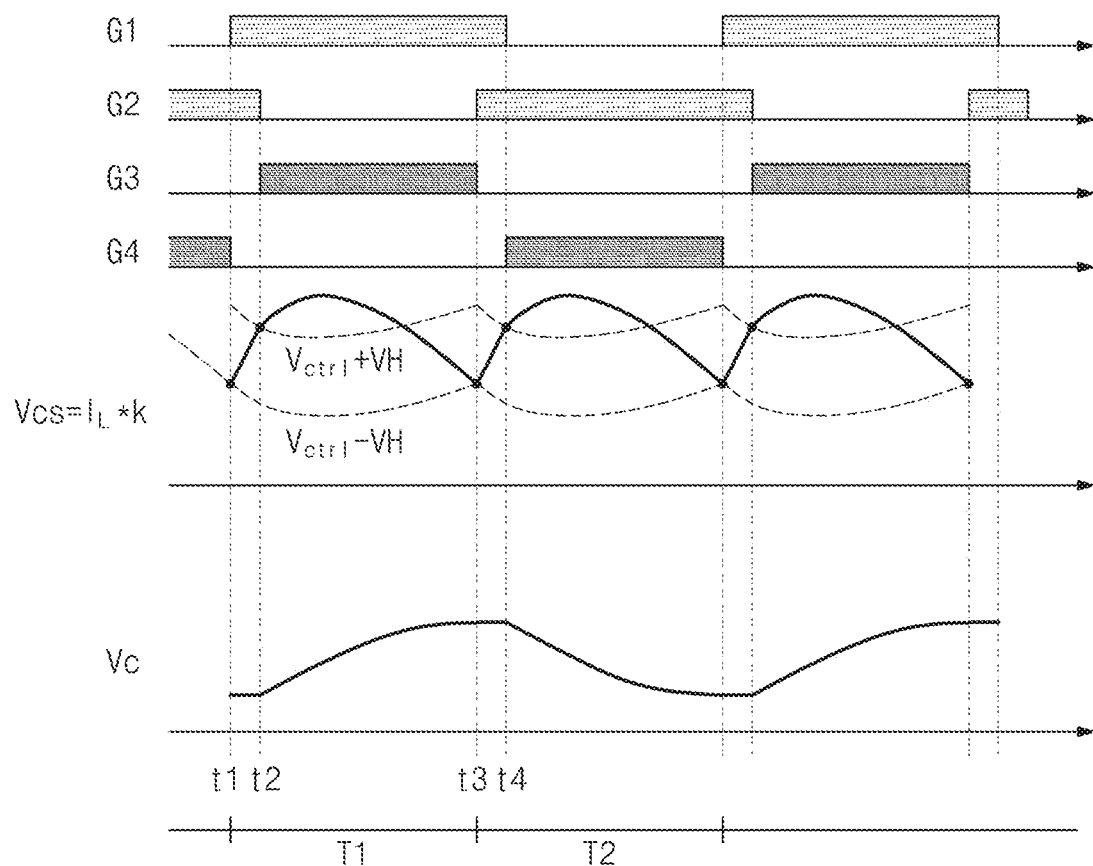
FIG. 16 is a diagram illustrating a change in a switching signal of a current control method in a first state of a second mode according to an embodiment.

FIG. 16 illustrates a change in a switching signal of a current control method in a first state of a second mode according to an embodiment.

Referring to FIG. 16, in the first state, the inductor current $I_L$ exceeds '0' and clamping does not occur in the voltage across both ends of the flying capacitor 260.

The turn-on time of the first switch 251 and the turn-on time of the second switch 252 may be determined by the inductor sensing voltage Vcs and the band lower limit voltage $V_{ctrl}$-VH. In the first period T1 of the sensing voltage Vcs, the first switch 251 may be turned on at a first time t1 when the inductor sensing voltage Vcs and the band lower limit voltage $V_{ctrl}$-VH are the same. The second switch 252 may be in ON state at the first time t1. In the second period T2 of the sensing voltage Vcs, the second switch 252 may be turned on at the third time t3 when the inductor sensing voltage Vcs and the band lower limit voltage $V_{ctrl}$-VH are the same. At the third time t3, the first switch 251 may be in ON state.

The turn-off time of the first switch 251 and the turn-off time of the second switch 252 may be determined by the inductor sensing voltage Vcs and the band upper limit voltage $V_{ctrl}$+VH. For example, in the first period T1, the second switch 252 may be turned off at the second time t2 when the inductor sensing voltage Vcs and the band upper limit voltage $V_{ctrl}$+VH are the same. At the second time t2, the first switch 251 may be in ON state. In the second period T2, the first switch 251 may be turned off at the fourth time t4 when the inductor sensing voltage Vcs and the band upper limit voltage $V_{ctrl}$+VH are the same. At the fourth time t4, the second switch 252 may be ON state.

In the first period T1 and the second period T2, the turn-on of the first switch 251 (occurs at the first time t1), the turn-off of the second switch 252 (occurs at the second time t2), the turn-on of the second switch 252 (occurs at the third time t3), and the turn-off of the first switch 251 (occurs at the fourth time t4) may occur sequentially.

The control signal G3 of the third switch 253 may have a form opposite to the control signal G2 of the second switch 252. Accordingly, the third switch 253 may be turned off when the second switch 252 is turned on, and may be turned on when the second switch 252 is turned off.

The control signal G4 of the fourth switch 254 may have a form opposite to the control signal G1 of the first switch 251. Accordingly, the fourth switch 254 may be turned off when the first switch 251 is turned on, and may be turned on when the first switch 251 is turned off.

The turn-off timing of the third switch 253 and the fourth switch 254 may be changed to prevent the inductor current $I_L$ from falling below '0'. The turn-on timing of the third switch 253 and the fourth switch 254 may be changed by clamping.

Figure 17:
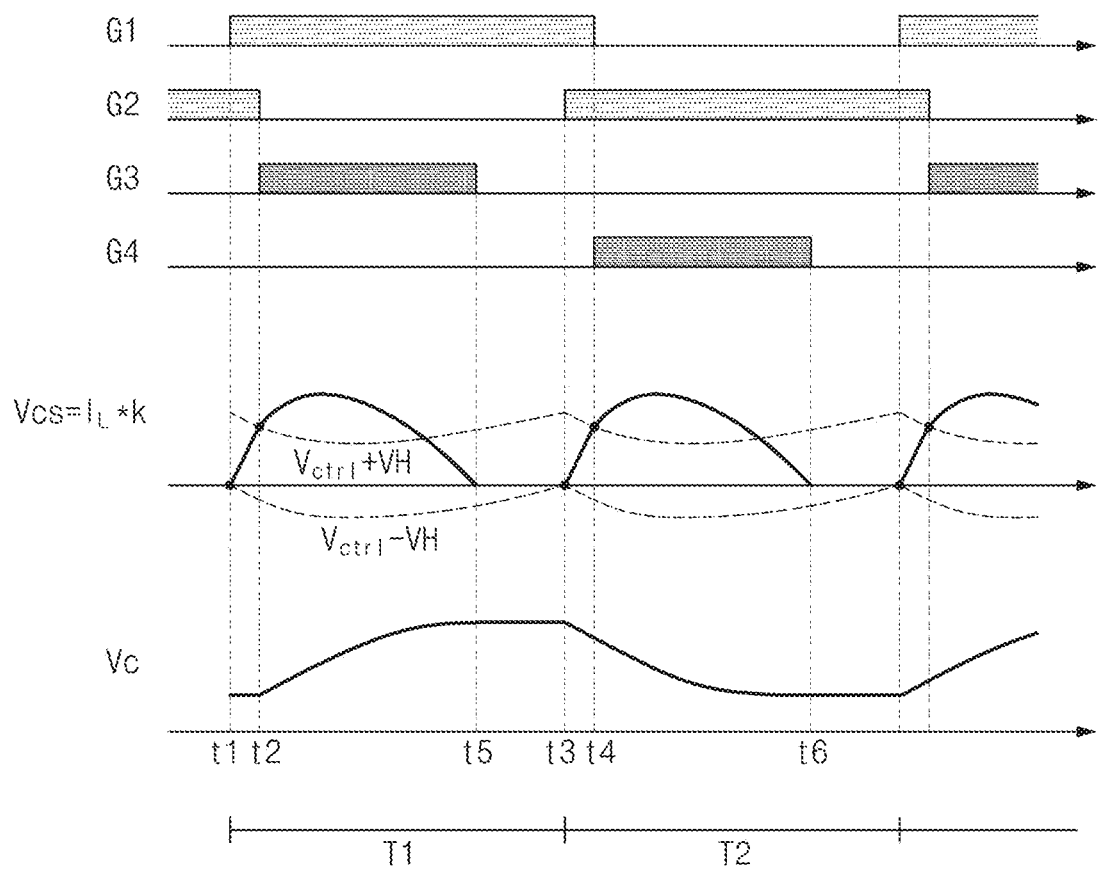
FIG. 17 is a diagram illustrating a change in a switching signal of a current control method in a second state of a second mode according to an embodiment.

FIG. 17 illustrates a change in a switching signal of a current control method in a second state of a second mode according to an embodiment.

Referring to FIG. 17, in the second state, the zero current period of the inductor current $I_L$ (e.g., the period in which $I_L$ is '0') is included, and the clamping does not occur in the voltage across both ends of the flying capacitor 260. For example, the inductor current $I_L$ may be changed depending on the load (e.g., the battery 220). When the load decreases, the DCM in which there is a period in which the inductor current $I_L$ becomes '0' may be operated (the second state). Since a period in which the current value of the inductor current $I_L$ becomes '0' is decreased as the load increases, the CCM in which the zero current period does not exist may be operated (the first state).

In the second state, the switching operation of the first switch 251 and the second switch 252 may be the same as that of FIG. 10 associated with the first state, as described above.

In the second state, the turn-on time of the third switch 253 may be the same as the turn-off time of the second switch 252, and the turn-on time of the fourth switch 254 may be the same as the turn-off time of the first switch 251. The turn-on timing of the third switch 253 and the fourth switch 254 may be changed by clamping of the voltage across both ends of the flying capacitor 260.

The turn-on timing of the third switch 253 and the fourth switch 254 may be changed by clamping.

The control circuit 1401 may control the turn-off timing of the third switch 253 or the fourth switch 254 by using a time point at which the inductor current $I_L$ becomes '0'. In this case, the third switch 253 or the fourth switch 254 may operate as the ideal diode. As a result, it is possible to prevent the inductor current $I_L$ from becoming a negative value.

In the first period T1, when the first switch 251 is in the turned on state at the fifth time t5 when the inductor current $I_L$ is '0'(e.g., the sensing voltage Vcs is '0'), the third switch 253 may be turned off. Accordingly, the third switch 253 may be turned off before the second switch 252 is turned on.

In the second period T2, when the second switch 252 is in the turned on state at the sixth time t6 and the inductor current $I_L$ is '0' (e.g., the sensing voltage Vcs is '0'), the fourth switch 254 may be turned off. Accordingly, the fourth switch 254 may be turned off before the first switch 251 is turned on.

Figure 18:
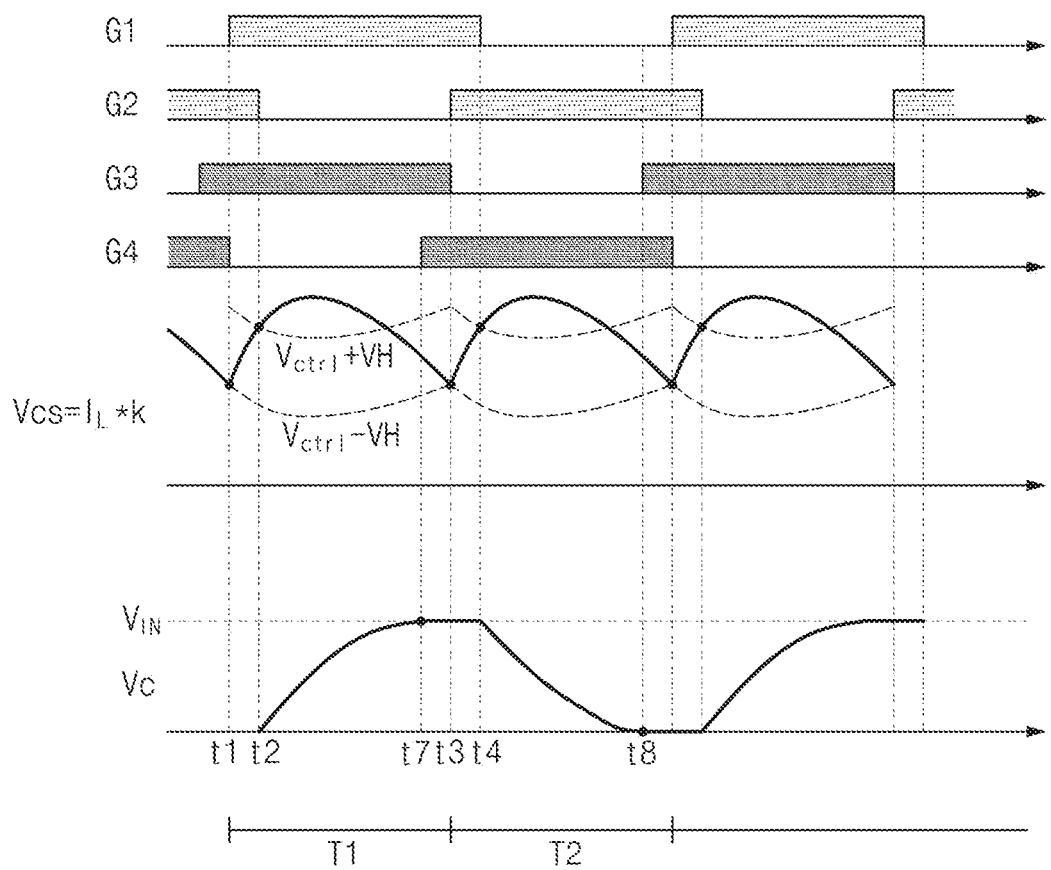
FIG. 18 is a diagram illustrating a change in a switching signal of a current control method in a third state of a second mode according to an embodiment.

FIG. 18 illustrates a change in a switching signal of a current control method in a third state of a second mode according to an embodiment.

Referring to FIG. 18, in the third state, the zero current period of the inductor current $I_L$ (e.g., a period in which $I_L$ is '0') is not included, and clamping occurs in the voltage across both ends of the flying capacitor 260.

In the third state, the switching operation of the first switch 251 and the second switch 252 may be the same as that of FIG. 10 associated with the first state, as described above.

The control circuit 1401 may control the turn-on timing of the third switch 253 or the fourth switch 254 by using a time point at which the voltage across both ends of the flying capacitor 260 is clamped to the input voltage $V_{IN}$ or the ground voltage 0V. When the voltage across both ends of the flying capacitor 260 is clamped to the input voltage $V_{IN}$ or the ground voltage 0V, if the third switch 253 and the fourth switch 254 are not turned on, the current may flow through the body diodes inside the third switch 253 and the fourth switch 254, and the switching loss may increase. When the voltage across both ends of the flying capacitor 260 is clamped to the input voltage $V_{IN}$ or the ground voltage 0V, the control circuit 1401 may reduce losses due to the current flowing through the body diodes inside the third switch 253 and the fourth switch 254, by turning on the third switch 253 and the fourth switch 254.

Because the voltage of the flying capacitor 260 is in the floating state, the control circuit 1401 may detect the zero crossing point of the upper voltage VCA (the voltage of the first node 410) of the flying capacitor 260 and the zero crossing point of the lower voltage VCB (the voltage of the third node 430) without directly detecting the voltage of the flying capacitor 260, and may determine the turn-on time of the third switch 253 and the fourth switch 254.

In the first period T1, the fourth switch 254 may be turned on at the seventh time t7 when the voltage VCB of the third node 430 crosses to '0'(e.g., the voltage Vc of both ends of the flying capacitor 260 being clamped to the input voltage $V_{IN}$). Accordingly, the fourth switch 254 may be turned on before the first switch 251 is turned off. The seventh time t7 may be a time point at which the body diode inside the fourth switch 254 starts to conduct.

In the second period T2, the third switch 253 may be turned on at the eighth time t8 when the voltage VCA of the first node 410 crosses to '0' (the voltage Vc of both ends of the flying capacitor 260 is clamped to the ground voltage 0V). Accordingly, the third switch 253 may be turned on before the second switch 252 is turned off. The eighth time t8 may be a time point at which the body diode inside the third switch 253 starts to conduct.

The turn-off time of the third switch 253 may be the same as the turn-on time of the second switch 252, and the turn-off time of the fourth switch 254 may be the same as the turn-on time of the first switch 251.

Figure 19:
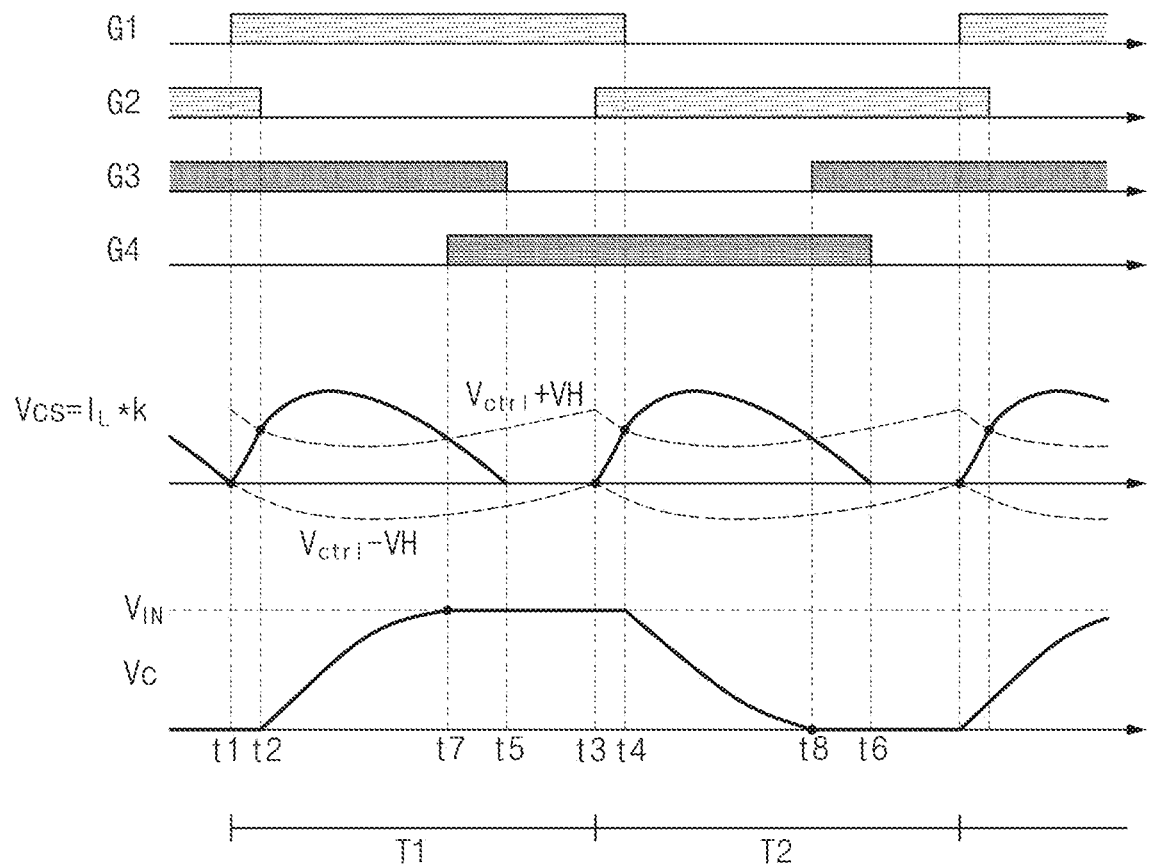
FIG. 19 is a diagram illustrating a change in a switching signal of a current control method in a fourth state of a second mode according to an embodiment.

FIG. 19 illustrates a change in a switching signal of a current control method in a fourth state of a second mode according to an embodiment.

Referring to FIG. 19, in the fourth state, the zero current period of the inductor current $I_L$ (e.g., a period in which $I_L$ is '0') is included and clamping occurs in the voltage across both ends of the flying capacitor 260.

In the fourth state, the switching operation of the first switch 251 and the second switch 252 may be the same as that of FIG. 10 associated with the first state, as described above.

The turn-on operation of the third switch 253 and the fourth switch 254 may be changed by a time point at which the voltage Vc across both ends of the flying capacitor 260 is clamped to the input voltage $V_{IN}$ or the ground voltage 0V. The turn-on operation of the third switch 253 and the fourth switch 254 may be the same as that of FIG. 18, and the turn-off operation of the third switch 253 and the fourth switch 254 may be the same as that of FIG. 17.

For example, in the first period T1, the fourth switch 254 may be turned on at the seventh time t7 when the voltage VCB of the third node 430 crosses to '0' (e.g., the voltage Vc across both ends of the flying capacitor 260 being clamped to the input voltage $V_{IN}$). The fourth switch 254 may be turned on before the first switch 251 is turned off.

In the first period T1, when the first switch 251 is in the turned on state at the fifth time 5 and the inductor current $I_L$ becomes '0'(e.g., the sensing voltage Vcs is '0'), the third switch 253 may be turned off. The third switch 253 may be turned off before the second switch 252 is turned on.

In the second period T2, the third switch 253 may be turned on at the eighth time t8 when the voltage VCA of the first node 410 is clamped to the ground voltage 0V. The third switch 253 may be turned on before the second switch 252 is turned off.

In the second period T2, when the second switch 252 is in the turned on state at the sixth time t6 and the inductor current $I_L$ becomes '0' (e.g., the sensing voltage Vcs is '0'), the fourth switch 254 may be turned off. The fourth switch 254 may be turned off before the first switch 251 is turned on.

An electronic device according to various embodiments in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 140) including an instruction stored in a machine-readable storage medium (e.g., an internal memory 136 or an external memory 138) readable by a machine (e.g., the electronic device 101). For example, the processor (e.g., the processor 120) of a machine (e.g., the electronic device 101) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, an electronic device (e.g., the electronic device 101 of FIG. 1, or the electronic device 201 of FIG. 2) includes a battery, a power management module electrically connected to the battery and that manages a charging or a discharging of the battery, and a processor electrically connected to the power management module, and the power management module includes a charging circuit including a plurality of switches, at least one capacitor, and at least one inductor, and that receives power from an external power supply device, and the power management module is configured to identify an electrical connection between the charging circuit and the external power supply device, to determine a type of the connected external power supply device, to allow the charging circuit to operate in a first mode in which the plurality of switches are controlled such that the charging circuit has a fixed voltage conversion ratio due to a resonance of the capacitor and the inductor to charge the battery, when the type of the external power supply device is a first type, and to allow the charging circuit to operate in a second mode in which the plurality of switches are controlled such that a voltage conversion ratio to be changed in response to a charging ratio of the battery to charge the battery, when the type of the external power supply device is a second type.

According to various embodiments, the power management module may determine the type of the external power supply device, based on a power delivery (PD) communication.

According to various embodiments, the power management module, in the first mode, may control the plurality of switches, based on a signal having a fixed duty cycle.

According to various embodiments, the power management module, in the first mode, may control the plurality of switches, based on the signal having a duty cycle of 50%.

According to various embodiments, the power management module may allow the signal to have the same frequency as a resonant frequency of the capacitor and the inductor.

According to various embodiments, in the first mode, a current flowing through the capacitor and a voltage across both ends of the capacitor may have a sine wave characteristic.

According to various embodiments, in the first mode, a current flowing through the inductor may have a half wave characteristic of a sine wave.

According to various embodiments, the power management module, in the second mode, may control the plurality of switches, based on a signal having a duty cycle that varies in response to the charging ratio of the battery.

According to various embodiments, the power management module may change the duty cycle of the signal, based on a PWM.

According to various embodiments, in the second mode, the power management module may allow the signal to have the same frequency as a resonant frequency of the capacitor and the inductor.

According to various embodiments, the plurality of switches may include a first switch electrically connected between a power terminal of the external power supply device and a first node, a second switch electrically connected between the first node and the second node, a third switch electrically connected between the second node and a third node, and a fourth switch electrically connected between the third node and a ground terminal, and one end of the capacitor may be connected to the first node, the other end of the capacitor may be connected to the third node, one end of the inductor may be connected to the second node, and the other end of the inductor may be connected to a charging terminal of the battery.

According to various embodiments, in the first mode, a first control signal that controls the first switch and the third switch may have a phase opposite to that of a second control signal that controls the second switch and the fourth switch.

According to various embodiments, in the second mode, the first switch may be operated by a first control signal, the second switch may be operated by a second control signal, the third switch may be operated by a third control signal, and the fourth switch may be operated by a fourth control signal, and the first control signal may have a phase opposite to that of the fourth control signal, and the second control signal may have a phase opposite to that of the third control signal.

According to various embodiments, the first control signal, the second control signal, the third control signal, and the fourth control signal may have a duty cycle that varies in response to the charging ratio of the battery.

According to various embodiments, the power management module may change the duty cycle of the first control signal to the fourth control signal, based on a PWM.

According to various embodiments, the power management module may control the plurality of switches, based on a control signal received from the processor.

According to various embodiments, when the external power supply device includes a circuit for controlling a constant voltage or a constant current for the battery, the power management module may determine the external power supply device as the first type.

According to various embodiments, the power management module may control a switching frequency for controlling the plurality of switches in the second mode faster than a switching frequency for controlling the plurality of switches in the first mode.

According to various embodiments, a charging method of a battery, which is performed in a power management module of an electronic device, includes identifying an electrical connection between a charging circuit included in the power management module and an external power supply device, controlling a plurality of switches included in the charging circuit to have a fixed voltage conversion ratio due to a resonance of a capacitor and an inductor included in the charging circuit, when the connected external power supply device is a first type, and controlling the plurality of switches such that a voltage conversion ratio is changed in response to a charging ratio of the battery, when the connected external power supply device is a second type.

According to various embodiments, the plurality of switches may include a first switch electrically connected between a power terminal of the external power supply device and a first node, a second switch electrically connected between the first node and the second node, a third switch electrically connected between the second node and a third node, and a fourth switch electrically connected between the third node and a ground terminal, and one end of the capacitor may be connected to the first node, the other end of the capacitor may be connected to the third node, one end of the inductor may be connected to the second node, and the other end of the inductor may be connected to a charging terminal of the battery.

According to various embodiments, the power management module may determine a control voltage, based on a voltage of the charging terminal of the battery or a current flowing into the charging terminal, the power management module may turn on or off the first switch, based on a first triangle wave and the control voltage, the power management module may turn on or off the second switch, based on a second triangle wave and the control voltage, and the second triangle wave may be a signal in which the first triangle wave is shifted by a half period.

According to various embodiments, the power management module may turn on the first switch when the control voltage is less than the first triangle wave, the power management module may turn off the first switch when the control voltage is greater than the first triangle wave, the power management module may turn on the second switch when the control voltage is less than the second triangle wave, and the power management module may turn off the second switch when the control voltage is greater than the second triangle wave.

According to various embodiments, the power management module may allow the third switch to be operated by a control signal having a phase opposite to that of the control signal of the second switch, and the power management module may allow the fourth switch to be operated by a control signal having a phase opposite to that of the control signal of the first switch.

According to various embodiments, when an inductor current flowing through the inductor becomes 0 before the second switch is turned on, the power management module may turn off the third switch, and when the inductor current becomes 0 before the first switch is turned on, the power management module may turn off the fourth switch.

According to various embodiments, when a voltage of the first node is the same as a ground voltage before the second switch is turned off, the power management module may turn on the third switch, and when a voltage of the third node is the same as the ground voltage before the first switch is turned off, the power management module may turn on the fourth switch.

According to various embodiments, when an inductor current flowing through the inductor becomes 0 before the second switch is turned on, the power management module may turn off the third switch, and when the inductor current becomes 0 before the first switch is turned on, the power management module may turn off the fourth switch.

According to various embodiments, the power management module may control the plurality of switches, based on a control signal received from the processor.

According to various embodiments, when the external power supply device includes a circuit for controlling a constant voltage or a constant current for the battery, the power management module may determine the external power supply device as the first type.

According to various embodiments, a charging method of a battery, which is performed in a power management module of an electronic device, includes identifying an electrical connection between a charging circuit included in the power management module and an external power supply device, controlling a plurality of switches included in the charging circuit to have a fixed voltage conversion ratio due to a resonance of a capacitor and an inductor included in the charging circuit, when the connected external power supply device is a first type, and controlling the plurality of switches such that a voltage conversion ratio in response to a charging ratio of the battery is changed, when the connected external power supply device is a second type.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, an electronic device may use a resonant SCVD to cope with a power supply device that supports the direct charging and a legacy power adapter that does not support the direct charging.

According to an embodiment, an electronic device may support charging of a plurality of types of power supply devices with a resonant SCVD by using switching control signals having different operating frequencies or different duty cycles.

According to an embodiment, an electronic device may configure a resonant SCVD by using a flying capacitor having a relatively small capacity.

According to an embodiment, an electronic device may configure a 3-level buck circuit by using a resonant SCVD circuit.

According to an embodiment, an electronic device may control switching by using current flowing through an inductor of a resonant SCVD or voltage across both ends of a flying capacitor. As a result, power conversion efficiency during charging may be increased, electromagnetic interference (EMI) may be reduced, and system efficiency may be improved due to an operation of a resonant converter.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
    a battery;
    a power management module electrically connected to the battery and configured to manage charging or discharging of the battery,
    wherein the power management module includes:
        a charging circuit including a plurality of switches,
        a capacitor, and
        an inductor, and
    wherein the power management module is further configured to:
        identify an electrical connection between the charging circuit and an external power supply device,
        receive power from the external power supply device,
        determine a type of the external power supply device,
        control the charging circuit to operate in a first mode in which the plurality of switches are controlled such that the charging circuit has a fixed voltage conversion ratio due to a resonance of the capacitor and the inductor, to charge the battery, when the type of the external power supply device is a first type, and
        control the charging circuit to operate in a second mode in which the plurality of switches are controlled such that a voltage conversion ratio changes in response to a charging ratio of the battery, to charge the battery, when the type of the external power supply device is a second type.

2. The electronic device of claim 1, wherein the power management module is further configured to determine the type of the external power supply device, based on a power delivery (PD) communication.

3. The electronic device of claim 1, wherein the power management module is further configured to, in the first mode, control the plurality of switches, based on a signal having a fixed duty cycle.

4. The electronic device of claim 3, wherein the power management module is further configured to, in the first mode, control the plurality of switches, based on the signal having a duty cycle of 50%.

5. The electronic device of claim 3, wherein the power management module is further configured to control the signal to have a same frequency as a resonant frequency of the capacitor and the inductor.

6. The electronic device of claim 1, wherein, in the first mode, a current flowing through the capacitor and a voltage across both ends of the capacitor have a sine wave characteristic.

7. The electronic device of claim 1, wherein the power management module is further configured to, in the second mode, control the plurality of switches, based on a signal having a duty cycle that varies in response to the charging ratio of the battery.

8. The electronic device of claim 7, wherein the power management module is further configured to change the duty cycle of the signal, based on a pulse width modulation (PWM).

9. The electronic device of claim 7, wherein the power management module is further configured to, in the second mode, control the signal to have a same frequency as a resonant frequency of the capacitor and the inductor.

10. The electronic device of claim 1, wherein the plurality of switches comprise:
    a first switch electrically connected between a power terminal of the external power supply device and a first node;
    a second switch electrically connected between the first node and a second node;
    a third switch electrically connected between the second node and a third node; and
    a fourth switch electrically connected between the third node and a ground terminal,
        wherein a first end of the capacitor is connected to the first node,
        wherein a second end of the capacitor is connected to the third node,
        wherein a first end of the inductor is connected to the second node, and
        wherein a second end of the inductor is connected to a charging terminal of the battery.

11. The electronic device of claim 10, wherein, in the first mode, a first control signal that controls the first switch and the third switch has a phase opposite to that of a second control signal that controls the second switch and the fourth switch.

12. The electronic device of claim 10, wherein, in the second mode, the first switch is operated by a first control signal, the second switch is operated by a second control signal, the third switch is operated by a third control signal, and the fourth switch is operated by a fourth control signal,
    wherein the first control signal has a phase opposite to that of the fourth control signal, and
    wherein the second control signal has a phase opposite to that of the third control signal.

13. The electronic device of claim 12, wherein the first control signal, the second control signal, the third control signal, and the fourth control signal each have a duty cycle that varies in response to the charging ratio of the battery.

14. The electronic device of claim 13, wherein the power management module is further configured to change the duty cycle of the first control signal to the fourth control signal, based on a pulse width modulation (PWM).

15. The electronic device of claim 10, wherein the power management module is further configured to:
    determine a control voltage, based on a voltage of the charging terminal of the battery or a current flowing into the charging terminal,
    turn on or off the first switch, based on a first triangle wave and the control voltage, and
    turn on or off the second switch, based on a second triangle wave and the control voltage, and
    wherein the second triangle wave is a signal in which the first triangle wave is shifted by a half period.

16. The electronic device of claim 15, wherein the power management module is further configured to:
    turn on the first switch, when the control voltage is less than the first triangle wave,
    turn off the first switch, when the control voltage is greater than the first triangle wave, turn on the second switch, when the control voltage is less than the second triangle wave, and turn off the second switch, when the control voltage is greater than the second triangle wave.

17. The electronic device of claim 15, wherein the power management module is further configured to:

control the third switch to be operated by a control signal having a phase opposite to that of a control signal of the second switch, and control the fourth switch to be operated by a control signal having a phase opposite to that of a control signal of the first switch.

18. The electronic device of claim 15, wherein the power management module is further configured to:

turn off the third switch, when an inductor current flowing through the inductor becomes 0 before the second switch is turned on, and turn off the fourth switch, when the inductor current becomes 0 before the first switch is turned on.

19. The electronic device of claim 15, wherein the power management module is further configured to:

turn on the third switch, when a voltage of the first node is equal to a ground voltage before the second switch is turned off, and turn on the fourth switch, when a voltage of the third node is equal to the ground voltage before the first switch is turned off.

20. The electronic device of claim 19, wherein the power management module is further configured to:

turn off the third switch, when an inductor current flowing through the inductor becomes 0 before the second switch is turned on, and turn off the fourth switch wherein, when the inductor current becomes 0 before the first switch is turned on.

* * * * *